(12) United States Patent
Gimpl et al.

(10) Patent No.: US 9,152,176 B2
(45) Date of Patent: Oct. 6, 2015

(54) APPLICATION DISPLAY TRANSITIONS BETWEEN SINGLE AND MULTIPLE DISPLAYS

(75) Inventors: Martin Gimpl, Helsinki (FI); Paul Reeves, Oakville (CA); Sanjiv Sirpal, Oakville (CA)

(73) Assignee: Z124, George Town (KY)

( * ) Notice: Subject to any disclaimer, the term of this patent is extended or adjusted under 35 U.S.C. 154(b) by 213 days.

(21) Appl. No.: 13/247,982

(22) Filed: Sep. 28, 2011

(65) Prior Publication Data

US 2012/0081271 A1 Apr. 5, 2012

Related U.S. Application Data

(60) Provisional application No. 61/539,884, filed on Sep. 27, 2011, provisional application No. 61/458,150, filed on Nov. 17, 2010, provisional application No. 61/389,000, filed on Oct. 1, 2010, provisional application No. 61/389,117, filed on Oct. 1, 2010, provisional application No. 61/389,087, filed on Oct. 1, 2010.

(51) Int. Cl.
*G09G 5/00* (2006.01)
*G06F 1/16* (2006.01)
(Continued)

(52) U.S. Cl.
CPC ............ *G06F 1/1616* (2013.01); *G06F 1/16* (2013.01); *G06F 1/1641* (2013.01); *G06F 1/1677* (2013.01); *G06F 3/017* (2013.01); *G06F 3/048* (2013.01); *G06F 3/0412* (2013.01);
(Continued)

(58) Field of Classification Search
CPC ....... G09G 5/00; G06F 1/1616; G06F 1/1614; G06F 1/1677; G06F 1/16; G06F 3/048; G06F 3/04812; G06F 3/0482; G06F 3/0483; G06F 3/04883; G06F 3/0488; G06F 3/04886; G06F 3/017; G06F 3/0484; G06F 3/04842; G06F 3/0412; G06F 3/1423; G06F 2200/1614
USPC ............................................. 345/1.3
See application file for complete search history.

(56) References Cited

U.S. PATENT DOCUMENTS 5,889,517 A 3/1999 Ueda et al.
7,137,074 B1 11/2006 Newton et al.
(Continued)

FOREIGN PATENT DOCUMENTS

EP 1648149 4/2006
WO WO 2010/028403 3/2010
(Continued)

OTHER PUBLICATIONS

U.S. Appl. No. 13/187,026, Jul. 20, 2011, Chen.
(Continued)

*Primary Examiner* — Ryan A Lubit
*Assistant Examiner* — Yaron Cohen
(74) *Attorney, Agent, or Firm* — Sheridan Ross P.C.

(57) ABSTRACT

A multi-screen user device and methods for controlling data displayed are disclosed. The data displayed by the multiple screens of the device is dependent on the physical orientation of the device, whether the content for an application is displayed across a plurality of the multiple screens, and whether the data being displayed for the application originated from a single-screen application or a multi-screen application.

20 Claims, 20 Drawing Sheets

(51) Int. Cl.

| | | |
|---|---|---|
| *G06F 3/048* | (2013.01) | |
| *G06F 3/0481* | (2013.01) | |
| *G06F 3/0483* | (2013.01) | |
| *G06F 3/0488* | (2013.01) | |
| *G06F 3/01* | (2006.01) | |
| *G06F 3/0484* | (2013.01) | |
| *G06F 3/041* | (2006.01) | |
| *G06F 3/14* | (2006.01) | |

(52) U.S. Cl.
CPC ............ *G06F3/0481* (2013.01); *G06F 3/0483* (2013.01); *G06F 3/0484* (2013.01); *G06F 3/0488* (2013.01); *G06F 3/04812* (2013.01); *G06F 3/04842* (2013.01); *G06F 3/04883* (2013.01); *G06F 3/04886* (2013.01); *G06F 3/1423* (2013.01); *G06F 2200/1614* (2013.01)

(56) References Cited

U.S. PATENT DOCUMENTS

| | | | |
|---|---|---|---|
| 7,636,899 | B2 | 12/2009 | Purcell et al. |
| 7,739,604 | B1 | 6/2010 | Lyons et al. |
| 8,108,782 | B2 | 1/2012 | Rajpal et al. |
| 8,290,540 | B2 | 10/2012 | Kittel et al. |
| 8,300,022 | B2 * | 10/2012 | Brenneman et al. .......... 345/173 |
| 8,385,057 | B2 | 2/2013 | Liu et al. |
| 8,423,911 | B2 | 4/2013 | Chaudhri |
| 2002/0021278 | A1 | 2/2002 | Hinckley et al. |
| 2002/0089505 | A1 | 7/2002 | Ording |
| 2002/0140698 | A1 | 10/2002 | Robertson et al. |
| 2002/0140746 | A1 | 10/2002 | Gargi |
| 2004/0066408 | A1 | 4/2004 | Meyers et al. |
| 2004/0095401 | A1 | 5/2004 | Tomimori |
| 2006/0085384 | A1 | 4/2006 | Sato et al. |
| 2006/0183505 | A1 | 8/2006 | Willrich |
| 2007/0036346 | A1 | 2/2007 | Kwon |
| 2007/0048717 | A1 | 3/2007 | Hsieh |
| 2007/0234222 | A1 | 10/2007 | Yamaguchi et al. |
| 2008/0096593 | A1 | 4/2008 | Park |
| 2008/0119237 | A1 | 5/2008 | Kim |
| 2008/0165152 | A1 | 7/2008 | Forstall et al. |
| 2008/0204424 | A1 | 8/2008 | Jin et al. |
| 2008/0307350 | A1 | 12/2008 | Sabatelli et al. |
| 2009/0061970 | A1 | 3/2009 | Wylie et al. |
| 2009/0113330 | A1 | 4/2009 | Garrison et al. |
| 2009/0143141 | A1 | 6/2009 | Wells et al. |
| 2009/0177617 | A1 | 7/2009 | Lee |
| 2009/0199128 | A1 | 8/2009 | Matthews et al. |
| 2009/0204925 | A1 | 8/2009 | Bhat et al. |
| 2009/0278806 | A1 | 11/2009 | Duarte et al. |
| 2009/0298418 | A1 | 12/2009 | Michael et al. |
| 2009/0307623 | A1 | 12/2009 | Agarawala et al. |
| 2009/0319672 | A1 | 12/2009 | Reisman |
| 2010/0007603 | A1 * | 1/2010 | Kirkup .......................... 345/158 |
| 2010/0064244 | A1 | 3/2010 | Kilpatrick, II et al. |
| 2010/0064536 | A1 | 3/2010 | Caskey et al. |
| 2010/0079355 | A1 | 4/2010 | Kilpatrick et al. |
| 2010/0081475 | A1 | 4/2010 | Chiang et al. |
| 2010/0085274 | A1 | 4/2010 | Kilpatrick, II et al. |
| 2010/0085382 | A1 * | 4/2010 | Lundqvist et al. ............ 345/659 |
| 2010/0144433 | A1 | 6/2010 | Yamada et al. |
| 2010/0146422 | A1 | 6/2010 | Seong et al. |
| 2010/0146428 | A1 | 6/2010 | Ng et al. |
| 2010/0169822 | A1 | 7/2010 | Hollemans |
| 2010/0182247 | A1 | 7/2010 | Petschnigg et al. |
| 2010/0188352 | A1 | 7/2010 | Ikeda |
| 2010/0211872 | A1 | 8/2010 | Rolston et al. |
| 2010/0245106 | A1 | 9/2010 | Miller et al. |
| 2010/0245209 | A1 | 9/2010 | Miller et al. |
| 2010/0289826 | A1 | 11/2010 | Park et al. |
| 2011/0107272 | A1 | 5/2011 | Aguilar |
| 2011/0143769 | A1 | 6/2011 | Jones et al. |
| 2011/0167380 | A1 | 7/2011 | Stallings et al. |
| 2011/0187662 | A1 | 8/2011 | Lee et al. |
| 2011/0193806 | A1 | 8/2011 | Kim et al. |
| 2011/0202834 | A1 * | 8/2011 | Mandryk et al. .............. 715/701 |
| 2011/0237303 | A1 | 9/2011 | Matsuda |
| 2012/0081268 | A1 | 4/2012 | Sirpal et al. |
| 2012/0081280 | A1 | 4/2012 | Schrock et al. |
| 2012/0081309 | A1 | 4/2012 | Sirpal et al. |
| 2012/0081311 | A1 | 4/2012 | Sirpal et al. |
| 2012/0081400 | A1 | 4/2012 | Schrock et al. |
| 2012/0084675 | A1 | 4/2012 | Sirpal et al. |
| 2012/0084710 | A1 | 4/2012 | Sirpal et al. |
| 2012/0117495 | A1 | 5/2012 | Sirpal et al. |
| 2012/0124490 | A1 | 5/2012 | Sirpal et al. |
| 2012/0124515 | A1 | 5/2012 | Li et al. |
| 2012/0266098 | A1 | 10/2012 | Webber |
| 2013/0079062 | A1 | 3/2013 | Sirpal et al. |
| 2013/0097532 | A1 | 4/2013 | Reeves et al. |

FOREIGN PATENT DOCUMENTS

| | | |
|---|---|---|
| WO | WO 2012/044780 | 4/2012 |
| WO | WO 2012/044801 | 4/2012 |
| WO | WO 2012/044809 | 4/2012 |

OTHER PUBLICATIONS

U.S. Appl. No. 13/366,483, Feb. 6, 2012, Sirpal et al.
U.S. Appl. No. 13/624,591, Sep. 21, 2012, Sirpal et al.
U.S. Appl. No. 13/627,577, Sep. 26, 2012, Sirpal et al.
U.S. Appl. No. 13/629,211, Sep. 27, 2012, Reeves et al.
Burns, "Motorola ATRIX 4G Laptop Dock Review," at www.androidcommunity.com/motorola-atrix-4g-laptop-dock-review-20110220/, Feb. 20, 2011, 5 pages.
Catacchio, "This smartphone has two huge screens . . . that rotate," The Next Web at www.thenextweb.com/asia/2010/10/07/this-smartphone-has-two-huge-screens-that-rotate/, Jul. 21, 2011, 2 pages.
Google images, accessed Apr. 18, 2011, 6 pages.
Harman03, "Kyocera Echo Dual-screen Android Phone," posted 4 weeks from Apr. 18, 2011, 3 pages.
"Lapdock™ for Motorola ATRIX," at www.motorola.com/Consumers/US-EN/Consumer-Product-and-Services/Mobile . . . , accessed Apr. 18, 2011, 1 page.
"Motorola ATRIX 4G Laptop Dock Review," at www.phonearena.com/reviews/Motorola-ATRIX-4G-Laptop-Dock-Review_id2667, Mar. 2, 2011, 6 pages.
Stein, S., "How does the Motorola Atrix 4G Lapdock compare with a laptop?" Crave—CNET, at www.news.cnet.com/8301-17938_105-20031251-1.html, Feb. 9, 2011, 7 pages.
Website entitled, "Kyocera Echo," at www.echobykyocera.com/, 2011, 6 pages.
Website entitled, "Sony Tablet," at www.store.sony.com/webapp/wcs/stores/servlet/CategoryDisplay?catalogId=10551&storeId=10151&langId=-1&categoryId=8198552921644795521, 2011, 3 pages.
International Search Report and Written Opinion for International Patent Application No. PCT/US11/53942, mailed Feb. 21, 2012, 8 pages.
International Search Report and Written Opinion for International Patent Application No. PCT/US11/53902, mailed Feb. 22, 2012, 9 pages.
International Search Report and Written Opinion for International Patent Application No. PCT/US11/53963, mailed Feb. 22, 2012, 7 pages.
Extended European Search Report for European Patent Application No. 11829892.6 dated Jul. 2, 2014, 7 pages.
Official Action for U.S. Appl. No. 13/247,369 mailed May 2, 2014, 21 pages.
Official Action for U.S. Appl. No. 13/366,483 mailed May 23, 2014, 18 pages.
Official Action for U.S. Appl. No. 13/629,211 mailed Apr. 17, 2014, 14 pages.
"iPhone User Guide for iPhone OS 3.1 Software," Apple Inc., 2009, 217 pages.

(56) References Cited

OTHER PUBLICATIONS

Ritchie, "iOS 4 features: Background app killing," imore.com, Aug. 10, 2010 [retrieved Dec. 14, 2013], 3 pages. Retrieved from: www.imore.com/ios-4-features-background-app-killing.

"Windows Media Player 10 Mobile for Smartphone." Microsoft Corporation, 2004, 20 pages.

Official Action for U.S. Appl. No. 13/247,369 mailed Jan. 7, 2015 7 pages.

Official Action for U.S. Appl. No. 13/247,708, mailed Sep. 12, 2014, 8 pages.

Official Action for U.S. Appl. No. 13/223,778, mailed Oct. 3, 2014 42 pages.

Notice of Allowance for U.S. Appl. No. 13/366,483, mailed Oct. 24, 2014, 7 pages.

Official Action for U.S. Appl. No. 13/624,591, mailed Dec. 4, 2014, 27 pages.

Official Action for U.S. Appl. No. 13/627,577, mailed Aug. 1, 2014 18 pages.

Notice of Allowance for U.S. Appl. No. 13/627,577, mailed Nov. 26, 2014 11 pages.

Official Action for U.S. Appl. No. 13/629,211 mailed Oct. 16, 2014, 14 pages.

Official Action for U.S. Appl. No. 13/629,211 mailed Jan. 16, 2015, 16 pages.

Soegaard, "Affordances." Interaction Design Foundation, (2010), 7 pages, [Retrieved May 29, 2013 from www.interaction-design.org/encyclopedia/affordances.html].

International Preliminary Report on Patentability for International (PCT) Patent Application No. PCT/US2011/053942, mailed Apr. 11, 2013 7 pages.

International Preliminary Report on Patentability for International (PCT) Patent Application No. PCT/US2011/053902, mailed Apr. 11, 2013 8 pages.

International Preliminary Report on Patentability for International (PCT) Patent Application No. PCT/US2011/053963, mailed Apr. 11, 2013 6 pages.

Official Action for U.S. Appl. No. 13/247,797, mailed Sep. 12, 2013 13 pages.

Notice off Allowance for U.S. Appl. No. 13/247,797, mailed Oct. 11, 2013 13 pages.

Official Action for U.S. Appl. No. 13/247,369, mailed Oct. 10, 2013 16 pages.

Official Action for U.S. Appl. No. 13/223,778, mailed Jun. 6, 2013 38 pages.

Official Action for U.S. Appl. No. 13/223,778, mailed Nov. 7, 2013 37 pages.

* cited by examiner

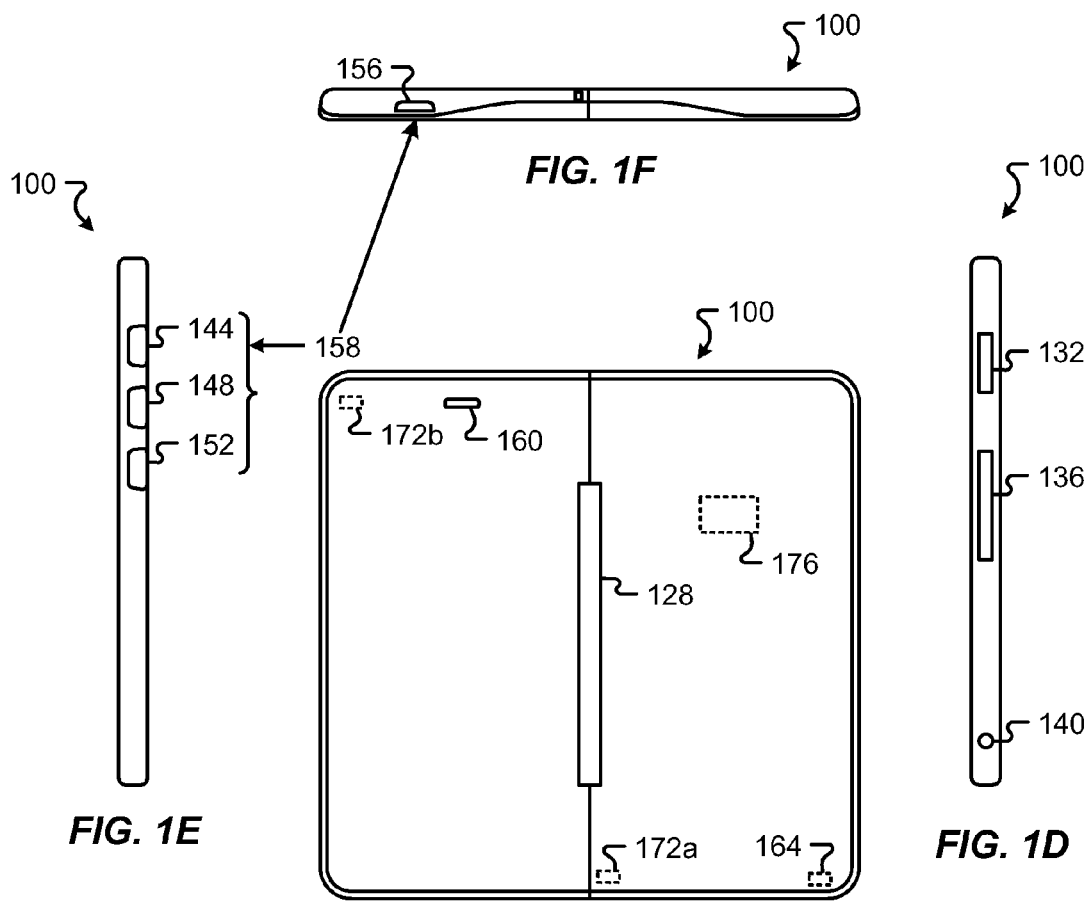
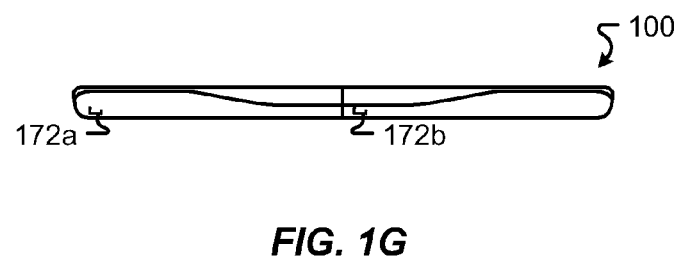

|  | PORTRAIT | | | | | | LANDSCAPE | | | | | |
|---|---|---|---|---|---|---|---|---|---|---|---|---|
|  | OPEN | CLOSED | EASEL | MODIFIED EASEL | PHONE | IMAGE/VIDEO | OPEN | CLOSED | EASEL | MODIFIED EASEL | PHONE | IMAGE/VIDEO |
| PORTRAIT OPEN | X | HT | HT | HT | P | I | AT | HAT | HAT | HAT | P | I |
| PORTRAIT CLOSED | HT | X | HAT | HAT | P | I | HAT | AT | HAT | HAT | P | I |
| PORTRAIT EASEL | HT | HT | X | HAT | P | I | HAT | HAT | HAT | HAT | P | I |
| PORTRAIT PHONE | HT | X | HT | X | X | X | HAT | HT | HAT | X | X | HAT |
| PORTRAIT IMAGE/VIDEO | HT | HT | HT | X | P | X | HT | HT | HAT | HAT | X |  |
| LANDSCAPE OPEN | AT | HAT | HAT | HAT | P | I | X | HT | HAT | HAT | P | I |
| LANDSCAPE CLOSED | HAT | AT | HAT | HAT | P | I | HT | X | HAT | HAT | P | I |
| LANDSCAPE EASEL | HAT | HAT | HAT | HAT | P | I | HT | HT | X | HAT | P | I |
| LANDSCAPE MODIFIED EASEL | HAT | HAT | HAT | HAT | P | I | HT | HT | HAT | X | P | I |
| LANDSCAPE IMAGE/VIDEO | HAT | HAT | HAT | HAT | HAT | AT | HT | HT | HT | HAT | P | X |
| DOCKED | DOCKING SIGNAL | | | | | | | | | | | |

FIG. 3B

Key:
H – Hall Effect Sensor(s)
a – accelerometer(s)
T – Timer
P – communications Trigger
I – Image / Video capture Request Tap Long Press Drag Flick Pinch Spread

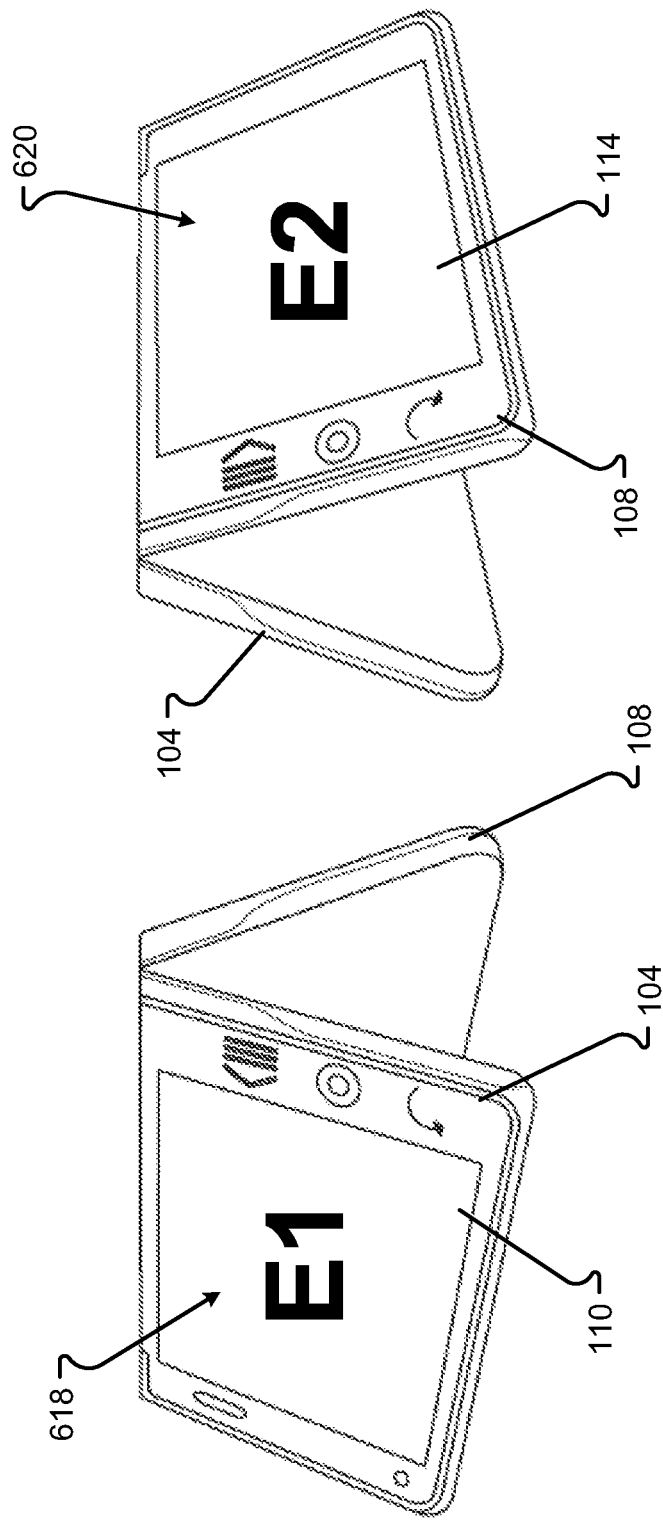

APPLICATION DISPLAY TRANSITIONS BETWEEN SINGLE AND MULTIPLE DISPLAYS

CROSS REFERENCE TO RELATED APPLICATION

The present application claims the benefits of and priority, under 35 U.S.C. §119(e), to U.S. Provisional Application Ser. Nos. 61/389,000, filed Oct. 1, 2010, entitled "DUAL DISPLAY WINDOWING SYSTEM;" 61/389,117, filed Oct. 1, 2010, entitled "MULTI-OPERATING SYSTEM PORTABLE DOCKING DEVICE;" 61/389,087, filed Oct. 1, 2010, entitled "TABLET COMPUTING USER INTERFACE;" 61/458,150, filed Nov. 17, 2010, entitled "Dual Screen Email Client;" 61/539,884, filed Sep. 27, 2011, entitled "MOBILE DEVICE." Each of the aforementioned documents is incorporated herein by this reference in their entirety for all that they teach and for all purposes.

BACKGROUND

A substantial number of handheld computing devices, such as cellular phones, tablets, and E-Readers, make use of a touch screen display not only to deliver display information to the user but also to receive inputs from user interface commands. While touch screen displays may increase the configurability of the handheld device and provide a wide variety of user interface options, this flexibility typically comes at a price. The dual use of the touch screen to provide content and receive user commands, while flexible for the user, may obfuscate the display and cause visual clutter, thereby leading to user frustration and loss of productivity.

The small form factor of handheld computing devices requires a careful balancing between the displayed graphics and the area provided for receiving inputs. On the one hand, the small display constrains the display space, which may increase the difficulty of interpreting actions or results. On the other, a virtual keypad or other user interface scheme is superimposed on or positioned adjacent to an executing application, requiring the application to be squeezed into an even smaller portion of the display.

This balancing act is particularly difficult for single display touch screen devices. Single display touch screen devices are crippled by their limited screen space. When users are entering information into the device, through the single display, the ability to interpret information in the display can be severely hampered, particularly when a complex interaction between display and interface is required.

SUMMARY

There is a need for a multi-display handheld computing device that provides for enhanced power and/or versatility compared to conventional single display handheld computing devices. In particular, the present disclosure is directed to a multi-screen user device and methods for controlling data displayed thereon. The data displayed by the multiple screens of the device is dependent on the physical orientation of the device, whether the content for an application is displayed across a plurality of the multiple screens, and whether the data being displayed for the application originated from a single-screen application or a multi-screen application. More particularly, an application displayed on only a single screen or display of the device may automatically be extended across two of the screens or displays of the device when, e.g., the two screens or displays are not folded together (i.e., unfolded from one another), and a physically higher of the screens supports such a multi-screen display of its content. Such an automatic extending across two screens or displays is referred to herein as "gravity drop". Additionally, an application, whose content is displayed across two screens concurrently, can automatically be displayed, under certain circumstances, on only one of the two screens. Such a reduction from two screens or displays to only a single such screen or display is referred to herein as "reverse gravity drop". These and other needs are addressed by the various aspects, embodiments, and/or configurations of the present disclosure. Also, while the disclosure is presented in terms of exemplary embodiments, it should be appreciated that individual aspects of the disclosure can be separately claimed.

In one embodiment, the present disclosure describes a method of controlling data displayed by a multi-screen device, comprising the steps (a) through (c) following:
   (a) determining that the multi-screen device has moved from a first physical orientation to a different second physical orientation, wherein the first and second physical orientations differ by the first physical orientation being one of: folded or in a landscape orientation;
   (b) determining whether a first screen and a second screen of the multi-screen device are each displaying content for a same application;
   (c) changing a display of the application to conform to a predetermined display configuration of the of the application on at least one of the first and second screens, wherein the display configuration is dependent upon the second physical orientation and a result of the step of determining;
wherein the above step of changing includes a step of modifying a display of the application: (a) from being displayed on only the first screen to being displayed on both the first and second screens at a same time, or (b) from being displayed on both the first and second screens at a same time to being displayed on only the first screen.

In a related embodiment, the present disclosure describes the multi-display device as having the following elements (a) through (f):
   (a) a first screen including a first display area;
   (b) a second screen including a second display area;
   (c) an attachment configured to foldably connect the first screen with the second screen;
   (d) a first sensor configured to produce a first signal indicative of a position of the hinge;
   (e) a second sensor configured to produce a second signal indicative of relative positions of the first screen to the second screen; and
   (f) a computer-readable medium having instructions stored thereon that include:
     (f-1) a first set of the instructions configured to determine that the multi-screen device has moved from a first physical orientation to a different second physical orientation, wherein the first and second physical orientations differ by the first physical orientation being one of: folded or in a landscape orientation;
     (f-2) a second set of the instructions configured to determine, whether a first screen and a second screen of the multi-screen device are each displaying content for a same application; and
     (f-3) a third set of the instructions configured to change a display of the application to conform to a predetermined display configuration of the of the application on at least one of the first and second screens, wherein the display configuration is dependent upon the second physical orientation and a result of the step of determining; and wherein the third set of the instructions are configured to modify a display of the application: (a) from being displayed on only the first screen to being displayed on both the first and second screens at a same time, or (b) from being displayed on both the first and second screens at a same time to being displayed on only the first screen.

The present disclosure can provide a number of advantages depending on the particular aspect, embodiment, and/or configuration. In particular, the gravity drop and reverse gravity drop operations available on the multi-display device provide an more intuitive and enhanced user experience for a user interacting with an embodiment of the multi-display device.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "application" as used herein refers to a software program and/or the display therefor on an electronic display screen, wherein the application is computer software designed to help the user to perform one or more predetermined tasks. Examples include enterprise software, accounting software, office suites, graphics software, and media players. An "application" has a user interface for receiving and presenting information from a user. An "application" as used herein typically refers to software (and/or its graphical presentation) wherein: (i) the application can be activated from a user input that explicitly identifies the application separately and independently from other applications; (ii) the application is interactive with the user for assisting the user in performing a task that the user is cognizant of and purposefully activates the application to perform the task, and (iii) the application is not viewed by the user as providing graphical interactions for graphically displaying other applications that are operable independently from the application for, e.g., one or more of being independently being installed, uninstalled, downloaded, displayed, not displayed, minimized or maximized, or of independently processing user input and displaying results therefrom.

The term "application window" refers to a potentially complex data structure(s) defining a graphical presentation of interrelated information that can be manipulated on a graphical display screen for moving, minimizing, and maximizing as a unit. Each application window has an "application" associated therewith that defines predetermined user input thereto to which the application window is responsive according to processing performed by the associated application. As referred to herein, an "application window" also refers its graphical presentation when the application window is displayed on an electronic display device such as a "touch screen" as one skilled in the art will appreciate.

The term "desktop" refers to a metaphor used to portray systems. A desktop is generally considered a "surface" that typically includes pictures, called icons, widgets, folders, etc. that can activate or show applications, windows, cabinets, files, folders, documents, and other graphical items thereon. The icons are generally selectable to initiate a task through user interface interaction to allow a user to execute applications or conduct other operations. More precisely, as used herein a "desktop" refers to a potentially complex data structure for providing graphical interactions for graphically displaying with a display of the desktop a plurality of applications such that by user input to the desktop, the displays of the applications can be rearranged relative to the desktop display, added to the desktop display, deleted from the desktop display, and activated from the desktop display. Each desktop includes or has associated therewith data identifying it as a desktop and not an application and not an application window. Similarly, each application and application window includes or has associated therewith data identifying it has an application or application window and not a desktop.

The term "display" refers to a portion of a screen used to display the output of a computer to a user.

The term "displayed image" refers to an image produced on the display. A typical displayed image is a window or desktop. The displayed image may occupy all or a portion of the display.

The term "display orientation" refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical. The multi-screen display can have one composite display that encompasses all the screens. The composite display can have different display characteristics based on the various orientations of the device.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "module" as used herein refers to any known or later developed hardware, software, firmware, artificial intelligence, fuzzy logic, or combination of hardware and software that is capable of performing the functionality associated with that element.

The term "gesture capture" refers to a sense or otherwise a detection of an instance and/or type of user gesture. The gesture capture can occur in one or more areas of the screen, A gesture region can be on the display, where it may be referred to as a touch sensitive display or off the display where it may be referred to as a gesture capture area.

A "multi-screen application" refers to an application that is capable of producing one or more windows that may simultaneously occupy multiple screens. A multi-screen application commonly can operate in single-screen mode in which one or more windows of the application are displayed only on one screen or in multi-screen mode in which one or more windows are displayed simultaneously on multiple screens.

A "single-screen application" refers to an application that is capable of producing one or more windows that may occupy only a single screen at a time.

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "window" refers to a, typically rectangular, displayed image on at least part of a screen display that contains or provides content different from the rest of the screen. Such a window may obscure a desktop for the screen display.

The terms "determine", "calculate" and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 1C includes a third view of an embodiment of a multi-screen user device 100;

FIG. 1D includes a fourth view of an embodiment of a multi-screen user device 100;

FIG. 1E includes a fifth view of an embodiment of a multi-screen user device 100;

FIG. 1F includes a sixth view of an embodiment of a multi-screen user device 100;

FIG. 1G includes a seventh view of an embodiment of a multi-screen user device 100;

FIG. 3B is a table of an embodiment of the state model for the device 100 based on the device's orientation and/or configuration;

FIG. 6G is a seventh representation of an embodiment of a device configuration generated in response to the device state for a device 100;

FIG. 6H is a eighth representation of an embodiment of a device configuration generated in response to the device state for a device 100;

Figure 1A:
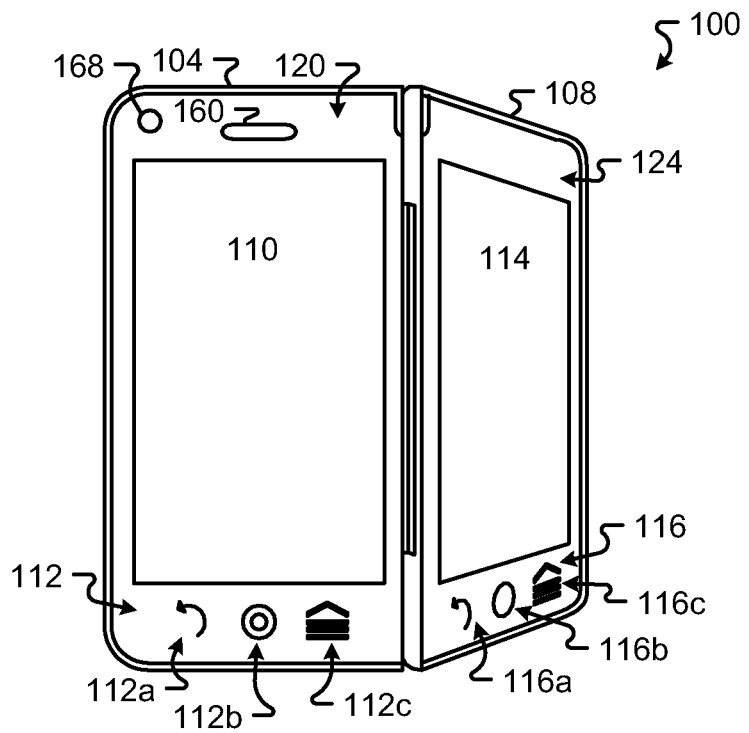
FIG. 1A includes a first view of an embodiment of a multi-screen user device 100.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a communications device, such as a cellular telephone, or other smart device. The device can include two screens that are oriented to provide several unique display configurations. Further, the device can receive user input in unique ways. The overall design and functionality of the device provides for an enhanced user experience making the device more useful and more efficient.

Mechanical Features:

FIGS. 1A-1J illustrate a device 100 in accordance with embodiments of the present disclosure. As described in greater detail below, device 100 can be positioned in a number of different ways each of which provides different functionality to a user. The device 100 is a multi-screen device that includes a primary screen 104 and a secondary screen 108, both of which are touch sensitive. In embodiments, the entire front surface of screens 104 and 108 may be touch sensitive and capable of receiving input by a user touching the front surface of the screens 104 and 108. Primary screen 104 includes touch sensitive display 110, which, in addition to being touch sensitive, also displays information to a user. Secondary screen 108 includes touch sensitive display 114, which also displays information to a user. In other embodiments, screens 104 and 108 may include more than one display area.

Primary screen 104 also includes a configurable area 112 that has been configured for specific inputs when the user touches portions of the configurable area 112. Secondary screen 108 also includes a configurable area 116 that has been configured for specific inputs. Areas 112a and 116a have been configured to receive a "back" input indicating that a user would like to view information previously displayed. Areas 112b and 116b have been configured to receive a "menu" input indicating that the user would like to view options from a menu. Areas 112c and 116c have been configured to receive a "home" input indicating that the user would like to view information associated with a "home" view. In other embodiments, areas 112a-c and 116a-c may be configured, in addition to the configurations described above, for other types of specific inputs including controlling features of device 100, some non-limiting examples including adjusting overall system power, adjusting the volume, adjusting the brightness, adjusting the vibration, selecting of displayed items (on either of screen 104 or 108), operating a camera, operating a microphone, and initiating/terminating of telephone calls. Also, in some embodiments, areas 112a-C and 116a-C may be configured for specific inputs depending upon the application running on device 100 and/or information displayed on touch sensitive displays 110 and/or 114.

In addition to touch sensing, primary screen 104 and secondary screen 108 may also include areas that receive input from a user without requiring the user to touch the display area of the screen. For example, primary screen 104 includes gesture capture area 120, and secondary screen 108 includes gesture capture area 124. These gesture capture areas are, e.g., capacitive touch sensitive areas which are able to receive user touch input to be used for recognizing gestures made by a user without the need for the user to actually touch the surface of the display area (i.e., display area 110 or 114). In comparison to touch sensitive displays 110 and 114, the gesture capture areas 120 and 124 are commonly not capable of rendering a displayed image, and in particular, cannot display a desktop or an application window.

Figure 1B:
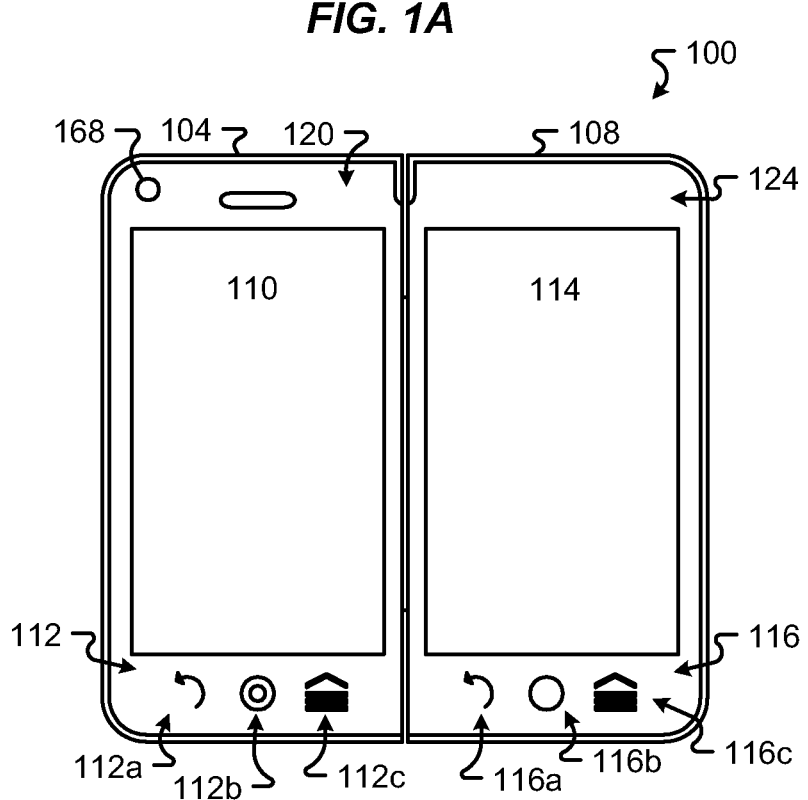
FIG. 1B includes a second view of an embodiment of a multi-screen user device 100.

The two screens 104 and 108 are connected together with a hinge 128, shown clearly in FIG. 1C (illustrating a back view of device 100). Hinge 128, in the embodiment shown in FIGS. 1A-1J, is a center hinge that connects screens 104 and 108 so that when the hinge is closed, screens 104 and 108 are juxtaposed (i.e., side-by-side) as shown in FIG. 1B (illustrating a front view of device 100). Hinge 128 can be opened to position the two screens 104 and 108 in different relative positions to each other. As described in greater detail below, the device 100 may have different functionalities depending on the relative positions of screens 104 and 108.

FIG. 1D illustrates the right side of device 100. As shown in FIG. 1D, secondary screen 108 also includes a card slot 132 and a port 136 on its side. Card slot 132 in embodiments, accommodates different types of cards including a subscriber identity module (SIM). Port 136 in embodiments is an input/output port (I/O port) that allows device 100 to be connected to other peripheral devices, such as a display, keyboard, or printing device. As can be appreciated, these are merely some examples and in other embodiments device 100 may include other slots and ports such as slots and ports for accommodating additional memory devices and/or for connecting other peripheral devices. Also shown in FIG. 1D is an audio jack 140 that accommodates a tip, ring, sleeve (TRS) connector for example to allow a user to utilize headphones or a headset.

Device 100 also includes a number of buttons 158. For example, FIG. 1E illustrates the left side of device 100. As shown in FIG. 1E, the side of primary screen 104 includes three buttons 144, 148, and 152, which can be configured for specific inputs. For example, buttons 144, 148, and 152 may be configured to, in combination or alone, control a number of aspects of device 100. Some non-limiting examples include overall system power, volume, brightness, vibration, selection of displayed items (on either of screen 104 or 108), a camera, a microphone, and initiation/termination of telephone calls. In some embodiments, instead of separate buttons two buttons may be combined into a rocker button. This arrangement is useful in situations where the buttons are configured to control features such as volume or brightness. In addition to buttons 144, 148, and 152, device 100 also includes a button 156, shown in FIG. 1F, which illustrates the top of device 100. In one embodiment, button 156 is configured as an on/off button used to control overall system power to device 100. In other embodiments, button 156 is configured to, in addition to or in lieu of controlling system power, control other aspects of device 100. In some embodiments, one or more of the buttons 144, 148, 152, and 156 are capable of supporting different user commands. By way of example, a normal press has a duration commonly of less than about 1 second and resembles a quick tap. A medium press has a duration commonly of 1 second or more but less than about 12 seconds. A long press has a duration commonly of about 12 seconds or more. The function of the buttons is normally specific to the application that is currently in focus on the respective display 110 and 114. In a telephone application for instance and depending on the particular button, a normal, medium, or long press can mean end call, increase in call volume, decrease in call volume, and toggle microphone mute. In a camera or video application for instance and depending on the particular button, a normal, medium, or long press can mean increase zoom, decrease zoom, and take photograph or record video.

There are also a number of hardware components within device 100. As illustrated in FIG. 1C, device 100 includes a speaker 160 and a microphone 164. Device 100 also includes a camera 168 (FIG. 1B). Additionally, device 100 includes two position sensors 172A and 172B, which are used to determine the relative positions of screens 104 and 108. In one embodiment, position sensors 172A and 172B are Hall effect sensors. However, in other embodiments other sensors can be used in addition to or in lieu of the Hall effect sensors. An accelerometer 176 may also be included as part of device 100 to determine the orientation of the device 100 and/or the orientation of screens 104 and 108. Additional internal hardware components that may be included in device 100 are described below with respect to FIG. 2.

The overall design of device 100 allows it to provide additional functionality not available in other communication devices. Some of the functionality is based on the various positions and orientations that device 100 can have. As shown in FIGS. 1B-1G, device 100 can be operated in an "open" position where screens 104 and 108 are juxtaposed. This position allows a large display area for displaying information to a user. When position sensors 172A and 172B determine that device 100 is in the open position, they can generate a signal that can be used to trigger different events such as displaying information on both screens 104 and 108. Additional events may be triggered if accelerometer 176 determines that device 100 is in a portrait position (FIG. 1B) as opposed to a landscape position (not shown).

Figure 1H:
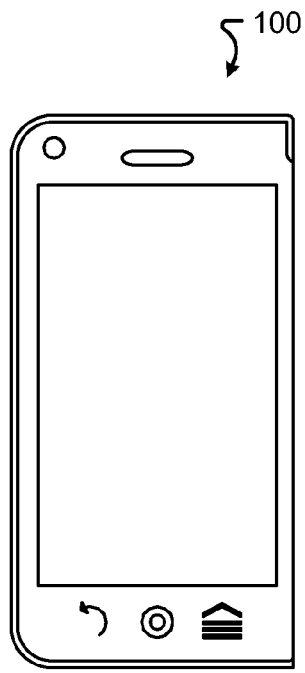
FIG. 1H includes a eighth view of an embodiment of a multi-screen user device 100.

In addition to the open position, device 100 may also have a "closed" position illustrated in FIG. 1H. Again, position sensors 172A and 172B can generate a signal indicating that device 100 is in the "closed" position. This can trigger an event that results in a change of displayed information on screen 104 and/or 108. For example, device 100 may be programmed to stop displaying information on one of the screens, e.g., screen 108, since a user can only view one screen at a time when device 100 is in the "closed" position. In other embodiments, the signal generated by position sensors 172A and 172B, indicating that the device 100 is in the "closed" position, can trigger device 100 to answer an incoming telephone call. The "closed" position can also be a preferred position for utilizing the device 100 as a mobile phone.

Figure 1I:
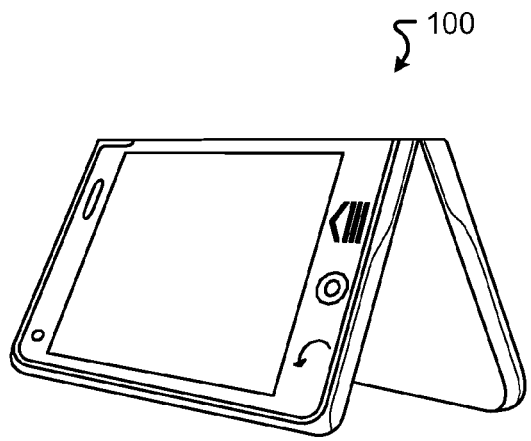
FIG. 1I includes a ninth view of an embodiment of a multi-screen user device 100.

Device 100 can also be used in an "easel" position which is illustrated in FIG. 1I. In the "easel" position, screens 104 and 108 are angled with respect to each other and facing outward with the edges of screens 104 and 108 substantially horizontal. In this position, device 100 can be configured to display information on both screens 104 and 108 to allow two users to simultaneously interact with device 100. When device 100 is in the "easel" position, sensors 172A and 172B generate a signal indicating that the screens 104 and 108 are positioned at an angle to each other, and the accelerometer 176 can generate a signal indicating that device 100 has been placed so that the edge of screens 104 and 108 are substantially horizontal. The signals can then be used in combination to generate events that trigger changes in the display of information on screens 104 and 108.

Figure 1J:
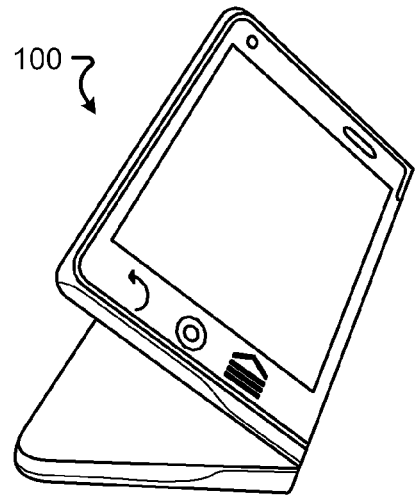
FIG. 1J includes a tenth view of an embodiment of a multi-screen user device 100.

FIG. 1J illustrates device 100 in a "modified easel" position. In the "modified easel" position, one of screens 104 or 108 is used as a stand and is faced down on the surface of an object such as a table. This position provides a convenient way for information to be displayed to a user in landscape orientation. Similar to the easel position, when device 100 is in the "modified easel" position, position sensors 172A and 172B generate a signal indicating that the screens 104 and 108 are positioned at an angle to each other. The accelerometer 176 would generate a signal indicating that device 100 has been positioned so that one of screens 104 and 108 is faced downwardly and is substantially horizontal. The signals can then be used to generate events that trigger changes in the display of information of screens 104 and 108. For example, information may not be displayed on the screen that is face down since a user cannot see the screen.

Transitional states are also possible. When the position sensors 172A and B and/or accelerometer indicate that the screens are being closed or folded (from open), a closing transitional state is recognized. Conversely when the position sensors 172A and B indicate that the screens are being opened or folded (from closed), an opening transitional state is recognized. The closing and opening transitional states are typically time-based, or have a maximum time duration from a sensed starting point. Normally, no user input is possible when one of the closing and opening states is in effect. In this manner, incidental user contact with a screen during the closing or opening function is not misinterpreted as user input. In embodiments, another transitional state is possible when the device 100 is closed. This additional transitional state allows the display to switch from one screen 104 to the second screen 108 when the device 100 is closed based on some user input, e.g., a double tap on the screen 110, 114.

As can be appreciated, the description of device 100 is made for illustrative purposes only, and the embodiments are not limited to the specific mechanical features shown in FIGS. 1A-1J and described above. In other embodiments, device 100 may include additional features, including one or more additional buttons, slots, display areas, hinges, and/or locking mechanisms. Additionally, in embodiments, the features described above may be located in different parts of device 100 and still provide similar functionality. Therefore, FIGS. 1A-1J and the description provided above are nonlimiting.

Figure 2:
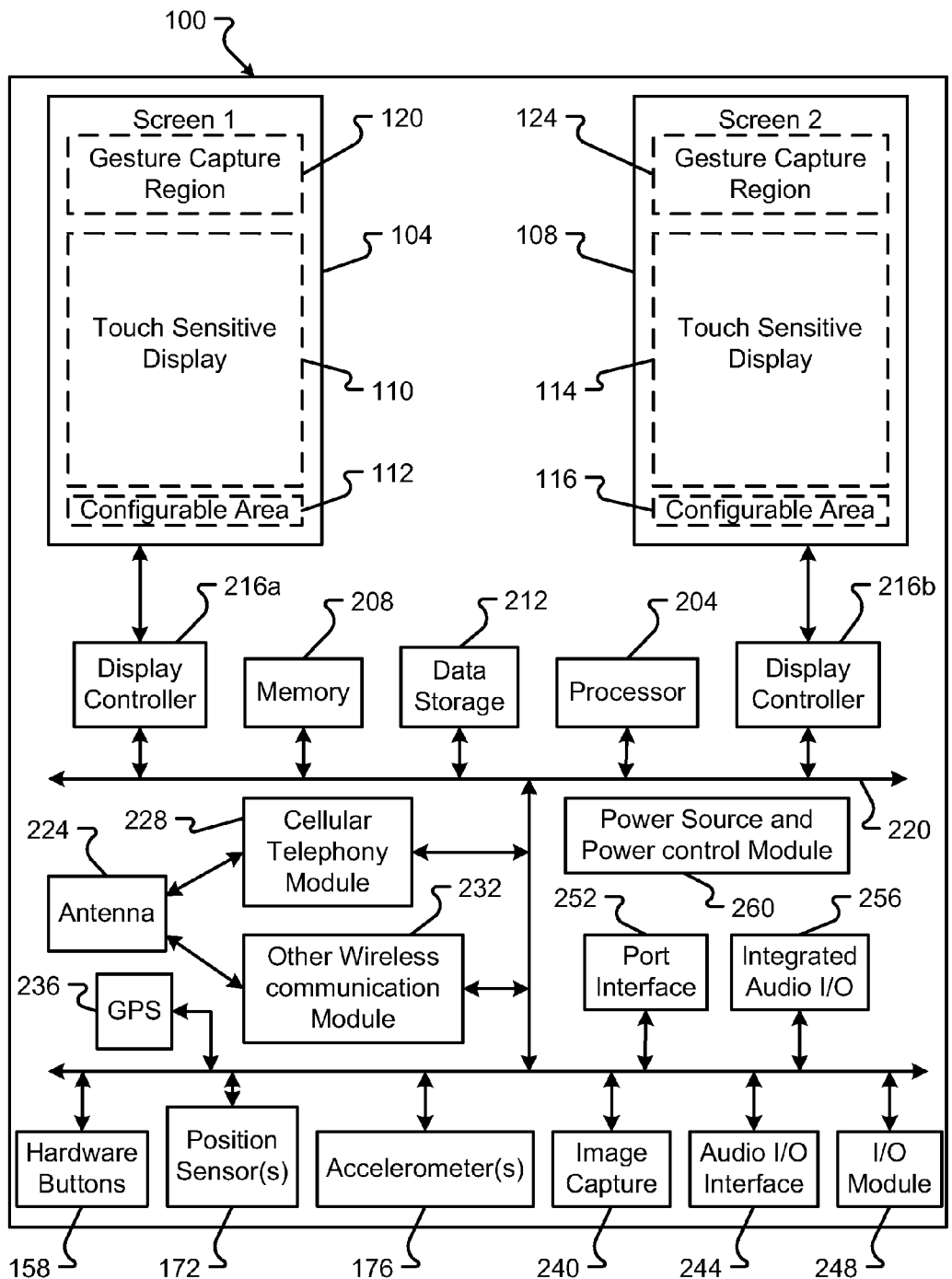
FIG. 2 is a block diagram of an embodiment of the hardware of the device 100.

Hardware Features:

FIG. 2 illustrates components of a device 100 in accordance with embodiments of the present disclosure. In general, the device 100 includes a primary screen 104 and a secondary screen 108. While the primary screen 104 and its components are normally enabled in both the opened and closed positions or states, the secondary screen 108 and its components are normally enabled in the opened state but disabled in the closed state. However, even when in the closed state a user or application triggered interrupt (such as in response to a phone application or camera application operation) can flip the active screen, or disable the primary screen 104 and enable the secondary screen 108, by a suitable command. Each screen 104, 108 can be touch sensitive and can include different operative areas. For example, a first operative area, within each touch sensitive screen 104 and 108, may comprise a touch sensitive display 110, 114. In general, the touch sensitive display 110, 114 may comprise a full color, touch sensitive display. A second area within each touch sensitive screen 104 and 108 may comprise a gesture capture region 120, 124. The gesture capture region 120, 124 may comprise an area or region that is outside of the touch sensitive display 110, 114 area, and that is capable of receiving input, for example in the form of gestures provided by a user. However, the gesture capture region 120, 124 does not include pixels that can perform a display function or capability.

A third region of the touch sensitive screens 104 and 108 may comprise a configurable area 112, 116. The configurable area 112, 116 is capable of receiving input and has display or limited display capabilities. In embodiments, the configurable area 112, 116 may present different input options to the user. For example, the configurable area 112, 116 may display buttons or other relatable items. Moreover, the identity of displayed buttons, or whether any buttons are displayed at all within the configurable area 112, 116 of a touch sensitive screen 104 or 108, may be determined from the context in which the device 100 is used and/or operated. In an exemplary embodiment, the touch sensitive screens 104 and 108 comprise liquid crystal display devices extending across at least those regions of the touch sensitive screens 104 and 108 that are capable of providing visual output to a user, and a capacitive input matrix over those regions of the touch sensitive screens 104 and 108 that are capable of receiving input from the user.

One or more display controllers 216a, 216b may be provided for controlling the operation of the touch sensitive screens 104 and 108, including input (touch sensing) and output (display) functions. In the exemplary embodiment illustrated in FIG. 2, a separate touch screen controller 216a or 216b is provided for each touch screen 104 and 108. In accordance with alternate embodiments, a common or shared touch screen controller 216 may be used to control each of the included touch sensitive screens 104 and 108. In accordance with still other embodiments, the functions of a touch screen controller 216 may be incorporated into other components, such as a processor 204.

The processor 204 may comprise a general purpose programmable processor or controller for executing application programming or instructions. In accordance with at least some embodiments, the processor 204 may include multiple processor cores, and/or implement multiple virtual processors. In accordance with still other embodiments, the processor 204 may include multiple physical processors. As a particular example, the processor 204 may comprise a specially configured application specific integrated circuit (ASIC) or other integrated circuit, a digital signal processor, a controller, a hardwired electronic or logic circuit, a programmable logic device or gate array, a special purpose computer, or the like. The processor 204 generally functions to run programming code or instructions implementing various functions of the device 100.

A communication device 100 may also include memory 208 for use in connection with the execution of application programming or instructions by the processor 204, and for the temporary or long term storage of program instructions and/or data. As examples, the memory 208 may comprise RAM, DRAM, SDRAM, or other solid state memory. Alternatively or in addition, data storage 212 may be provided. Like the memory 208, the data storage 212 may comprise a solid state memory device or devices. Alternatively or in addition, the data storage 212 may comprise a hard disk drive or other random access memory.

In support of communications functions or capabilities, the device 100 can include a cellular telephony module 228. As examples, the cellular telephony module 228 can comprise a GSM, CDMA, FDMA and/or analog cellular telephony transceiver capable of supporting voice, multimedia and/or data transfers over a cellular network. Alternatively or in addition, the device 100 can include an additional or other wireless communications module 232. As examples, the other wireless communications module 232 can comprise a Wi-Fi, BLUETOOTH™, WiMax, infrared, or other wireless communications link. The cellular telephony module 228 and the other wireless communications module 232 can each be associated with a shared or a dedicated antenna 224.

A port interface 252 may be included. The port interface 252 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 252 can support the supply of power to or from the device 100. The port interface 252 also comprises an intelligent element that comprises a docking module for controlling communications or other interactions between the device 100 and a connected device or component.

An input/output module 248 and associated ports may be included to support communications over wired networks or links, for example with other communication devices, server devices, and/or peripheral devices. Examples of an input/output module 248 include an Ethernet port, a Universal Serial Bus (USB) port, Institute of Electrical and Electronics Engineers (IEEE) 1394, or other interface.

An audio input/output interface/device(s) 244 can be included to provide analog audio to an interconnected speaker or other device, and to receive analog audio input from a connected microphone or other device. As an example, the audio input/output interface/device(s) 244 may comprise an associated amplifier and analog to digital converter. Alternatively or in addition, the device 100 can include an integrated audio input/output device 256 and/or an audio jack for interconnecting an external speaker or microphone. For example, an integrated speaker and an integrated microphone can be provided, to support near talk or speaker phone operations.

Hardware buttons 158 can be included for example for use in connection with certain control operations. Examples include a master power switch, volume control, etc., as described in conjunction with FIGS. 1A through 1J. One or more image capture interfaces/devices 240, such as a camera, can be included for capturing still and/or video images. Alternatively or in addition, an image capture interface/device 240 can include a scanner or code reader. An image capture interface/device 240 can include or be associated with additional elements, such as a flash or other light source.

The device 100 can also include a global positioning system (GPS) receiver 236. In accordance with embodiments of the present invention, the GPS receiver 236 may further comprise a GPS module that is capable of providing absolute location information to other components of the device 100. An accelerometer(s) 176 may also be included. For example, in connection with the display of information to a user and/or other functions, a signal from the accelerometer 176 can be used to determine an orientation and/or format in which to display that information to the user.

Embodiments of the present invention can also include one or more position sensor(s) 172. The position sensor 172 can provide a signal indicating the position of the touch sensitive screens 104 and 108 relative to one another. This information can be provided as an input, for example to a user interface application, to determine an operating mode, characteristics of the touch sensitive displays 110, 114, and/or other device 100 operations. As examples, a screen position sensor 172 can comprise a series of Hall effect sensors, a multiple position switch, an optical switch, a Wheatstonebridge, a potentiometer, or other arrangement capable of providing a signal indicating of multiple relative positions the touch screens are in.

Communications between various components of the device 100 can be carried by one or more buses 222. In addition, power can be supplied to the components of the device 100 from a power source and/or power control module 260. The power control module 260 can, for example, include a battery, an AC to DC converter, power control logic, and/or ports for interconnecting the device 100 to an external source of power.

Figure 3A:
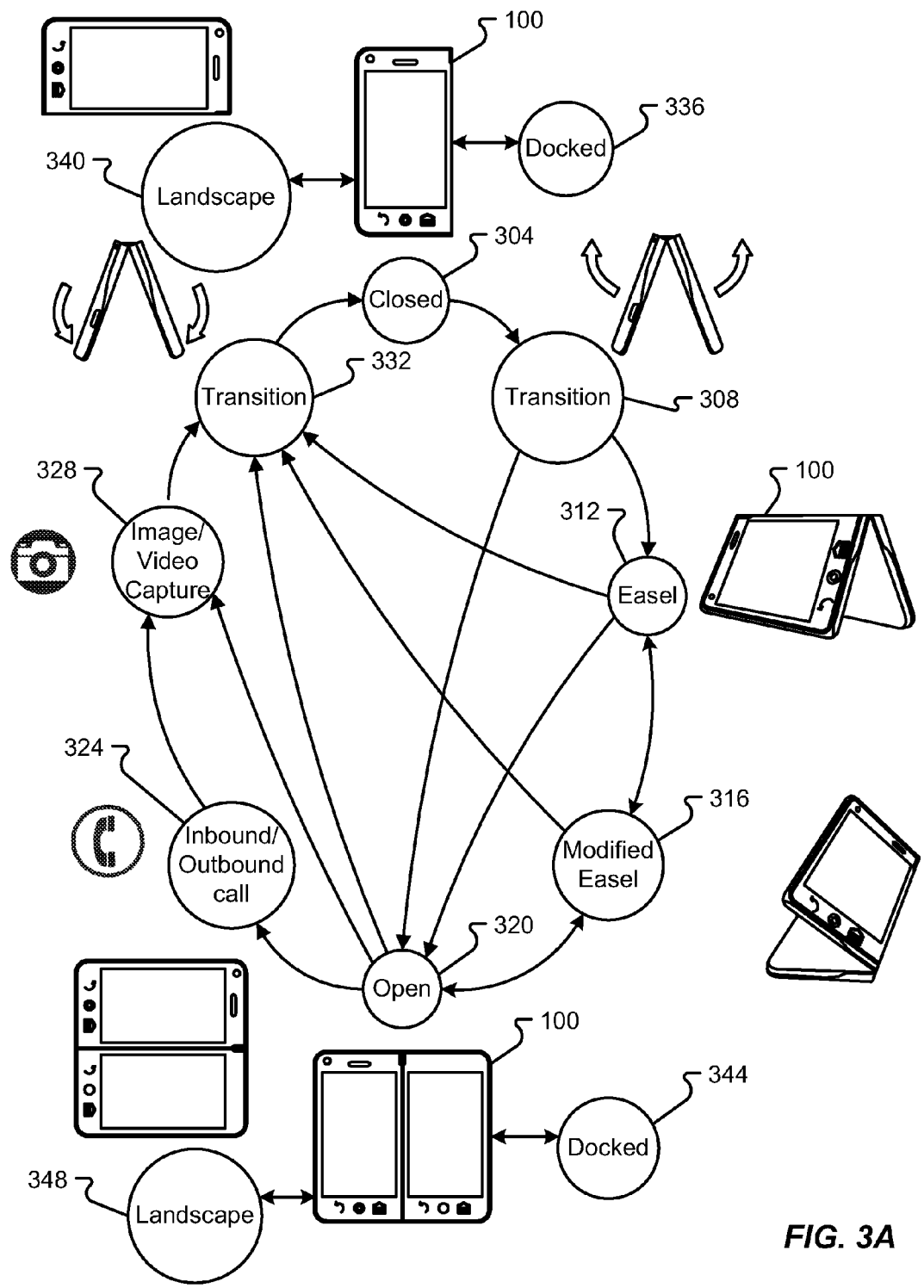
FIG. 3A is a block diagram of an embodiment of the state model for the device 100 based on the device's orientation and/or configuration.

Device State:

FIGS. 3A and 3B represent illustrative states of device 100. While a number of illustrative states are shown, and transitions from a first state to a second state, it is to be appreciated that the illustrative state diagram may not encompass all possible states and/or all possible transitions from a first state to a second state. As illustrated in FIG. 3, the various arrows between the states (illustrated by the state represented in the circle) represent a physical change that occurs to the device 100, that is detected by one or more of hardware and software, the detection triggering one or more of a hardware and/or software interrupt that is used to control and/or manage one or more functions of device 100.

As illustrated in FIG. 3A, there are twelve exemplary "physical" states: closed 304, transition 308 (or opening transitional state), easel 312, modified easel 316, open 320, inbound/outbound call or communication 324, image/video capture 328, transition 332 (or closing transitional state), landscape 340, docked 336, docked 344 and landscape 348. Next to each illustrative state is a representation of the physical state of the device 100 with the exception of states 324 and 328, where the state is generally symbolized by the international icon for a telephone and the icon for a camera, respectfully.

In state 304, the device is in a closed state with the device 100 generally oriented in the portrait direction with the primary screen 104 and the secondary screen 108 back-to-back in different planes (see FIG. 1H). From the closed state, the device 100 can enter, for example, docked state 336, where the device 100 is coupled with a docking station, docking cable, or in general docked or associated with one or more other devices or peripherals, or the landscape state 340, where the device 100 is generally oriented with the primary screen 104 facing the user, and the primary screen 104 and the secondary screen 108 being back-to-back.

In the closed state, the device can also move to a transitional state where the device remains closed but the display (of an application or desktop) is moved from one screen 104 to another screen 108 based on a user input, e.g., a double tap on the screen 110, 114. Still another embodiment includes a bilateral state. In the bilateral state, the device remains closed, but a single application displays at least one window on both the first display 110 and the second display 114. The windows shown on the first and second display 110, 114 may be the same or different based on the application and the state of that application. For example, while acquiring an image with a camera, the device may display the view finder on the first display 110 and displays a preview for the photo subjects (full screen and mirrored left-to-right) on the second display 114.

In state 308, a transition state from the closed state 304 to the semi-open state or easel state 312, the device 100 is shown opening with the primary screen 104 and the secondary screen 108 being rotated around a point of axis coincidence with the hinge. Upon entering the easel state 312, the primary screen 104 and the secondary screen 108 are separated from one another such that, for example, the device 100 can sit in an easel-like configuration on a surface.

In state 316, known as the modified easel position, the device 100 has the primary screen 104 and the secondary screen 108 in a similar relative relationship to one another as in the easel state 312, with the difference being one of the primary screen 104 or the secondary screen 108 are placed on a surface as shown.

State 320 is the open state where the primary screen 104 and the secondary screen 108 are generally on the same plane. From the open state, the device 100 can transition to the docked state 344 or the open landscape state 348. In the open state 320, the primary screen 104 and the secondary screen 108 are generally in the portrait-like orientation while in landscaped state 348 the primary screen 104 and the secondary screen 108 are generally in a landscape-like orientation.

State 324 is illustrative of a communication state, such as when an inbound or outbound call is being received or placed, respectively, by the device 100. While not illustrated for clarity, it should be appreciated the device 100 can transition to the inbound/outbound call state 324 from any state illustrated in FIG. 3. In a similar manner, the image/video capture state 328 can be entered into from any other state in FIG. 3, with the image/video capture state 328 allowing the device 100 to take one or more images via a camera and/or videos with a video capture device 240.

Transition state 322 illustratively shows primary screen 104 and the secondary screen 108 being closed upon one another for entry into, for example, the closed state 304.

FIG. 3B illustrates, with reference to the key, the inputs that are received to detect a transition from a first state to a second state. In FIG. 3B, various combinations of states are shown with in general, a portion of the columns being directed toward a portrait state 352, a landscape state 356, and a portion of the rows being directed to portrait state 360 and landscape state 364.

In FIG. 3B, the Key indicates that "H" represents an input from one or more Hall Effect sensors, "A" represents an input from one or more accelerometers, "T" represents an input from a timer, "P" represents a communications trigger input and "I" represents an image and/or video capture request input. Thus, in the center portion 376 of the chart, an input, or combination of inputs, are shown that represent how the device 100 detects a transition from a first physical state to a second physical state.

As discussed, in the center portion of the chart 376, the inputs that are received enable the detection of a transition from, for example, a portrait open state to a landscape easel state—shown in bold—"HAT." For this exemplary transition from the portrait open to the landscape easel state, a Hall Effect sensor ("H"), an accelerometer ("A") and a timer ("T") input may be needed. The timer input can be derived from, for example, a clock associated with the processor.

In addition to the portrait and landscape states, a docked state 368 is also shown that is triggered based on the receipt of a docking signal 372. As discussed above and in relation to FIG. 3, the docking signal can be triggered by the association of the device 100 with one or more other device 100s, accessories, peripherals, smart docks, or the like.

User Interaction:

FIGS. 4A through 4H depict various graphical representations of gesture inputs that may be recognized by the screens 104, 108. The gestures may be performed not only by a user's body part, such as a digit, but also by other devices, such as a stylus, that may be sensed by the contact sensing portion(s) of a screen 104, 108. In general, gestures are interpreted differently, based on where the gestures are performed (either directly on the display 110, 114 or in the gesture capture region 120, 124). For example, in one embodiment, gestures in the display 110,114 may be directed to a desktop or application, and gestures in the gesture capture region 120, 124 may be interpreted as for the system.

With reference to FIGS. 4A-4H, a first type of gesture, a touch gesture 420, is substantially stationary on the screen 104,108 for a selected length of time. A circle 428 represents a touch or other contact type received at particular location of a contact sensing portion of the screen. The circle 428 may include a border 432, the thickness of which indicates a length of time that the contact is held substantially stationary at the contact location. For instance, a tap 420 (or short press) has a thinner border 432a than the border 432b for a long press 424 (or for a normal press). The long press 424 may involve a contact that remains substantially stationary on the screen for longer time period than that of a tap 420. As will be appreciated, differently defined gestures may be registered depending upon the length of time that the touch remains stationary prior to contact cessation or movement on the screen.

Figure 4A:
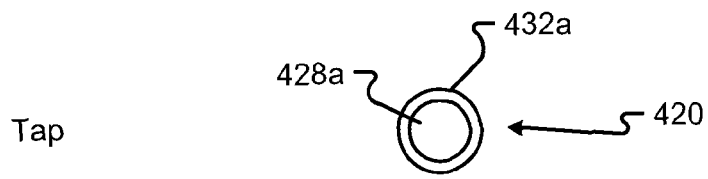
FIG. 4A is a first representation of an embodiment of user gesture received at a device 100.
Figure 4B:
FIG. 4B is a second representation of an embodiment of user gesture received at a device 100.
Figure 4C:
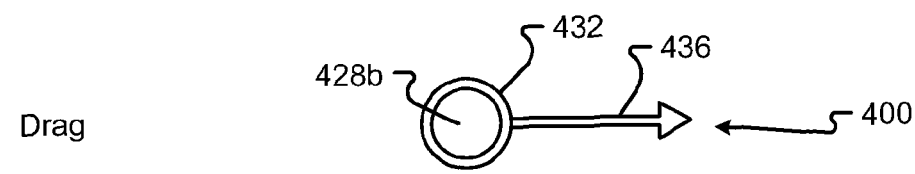
FIG. 4C is a third representation of an embodiment of user gesture received at a device 100.

With reference to FIG. 4C, a drag gesture 400 on the screen 104,108 is an initial contact (represented by circle 428) with contact movement 436 in a selected direction. The initial contact 428 may remain stationary on the screen 104,108 for a certain amount of time represented by the border 432. The drag gesture typically requires the user to contact an icon, window, or other displayed image at a first location followed by movement of the contact in a drag direction to a new second location desired for the selected displayed image. The contact movement need not be in a straight line but have any path of movement so long as the contact is substantially continuous from the first to the second locations.

Figure 4D:
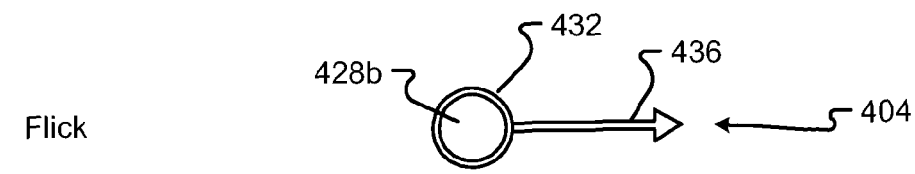
FIG. 4D is a fourth representation of an embodiment of user gesture received at a device 100.

With reference to FIG. 4D, a flick gesture 404 on the screen 104,108 is an initial contact (represented by circle 428) with truncated contact movement 436 (relative to a drag gesture) in a selected direction. In embodiments, a flick has a higher exit velocity for the last movement in the gesture compared to the drag gesture. The flick gesture can, for instance, be a finger snap following initial contact. Compared to a drag gesture, a flick gesture generally does not require continual contact with the screen 104,108 from the first location of a displayed image to a predetermined second location. The contacted displayed image is moved by the flick gesture in the direction of the flick gesture to the predetermined second location. Although both gestures commonly can move a displayed image from a first location to a second location, the temporal duration and distance of travel of the contact on the screen is generally less for a flick than for a drag gesture.

Figure 4E:
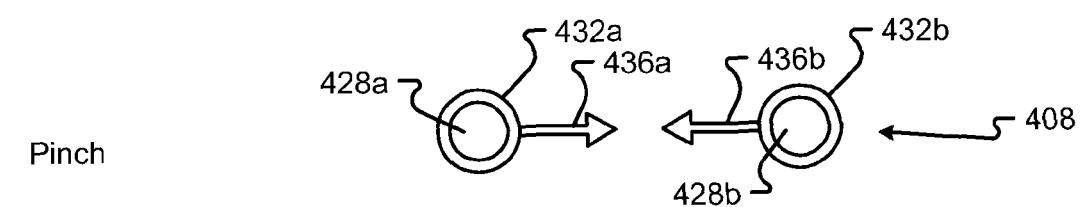
FIG. 4E is a fifth representation of an embodiment of user gesture received at a device 100.

With reference to FIG. 4E, a pinch gesture 408 on the screen 104,108 is depicted. The pinch gesture 408 may be initiated by a first contact 428 to the screen 104,108 by, for example, a first digit and a second contact 428b to the screen 104,108 by, for example, a second digit. The first and second contacts 428a,b may be detected by a common contact sensing portion of a common screen 104,108, by different contact sensing portions of a common screen 104 or 108, or by different contact sensing portions of different screens. The first contact 428a is held for a first amount of time, as represented by the border 432a, and the second contact 428b is held for a second amount of time, as represented by the border 432b. The first and second amounts of time are generally substantially the same, and the first and second contacts 428a, b generally occur substantially simultaneously. The first and second contacts 428a, b generally also include corresponding first and second contact movements 436a, b, respectively. The first and second contact movements 436a, b are generally in opposing directions. Stated another way, the first contact movement 436a is towards the second contact 436b, and the second contact movement 436b is towards the first contact 436a. More simply stated, the pinch gesture 408 may be accomplished by a user's digits touching the screen 104,108 in a pinching motion.

Figure 4F:
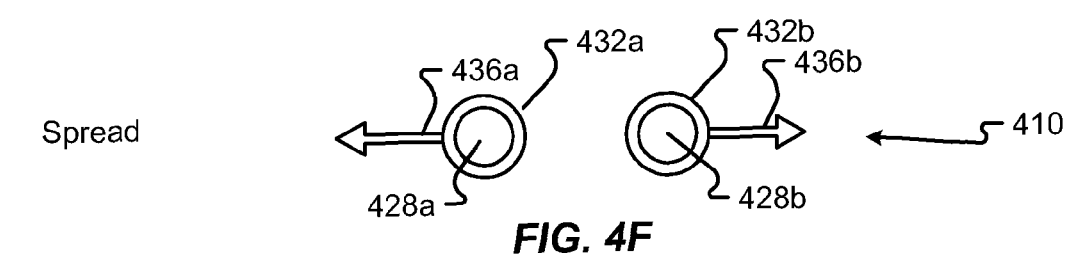
FIG. 4F is a sixth representation of an embodiment of user gesture received at a device 100.

With reference to FIG. 4F, a spread gesture 410 on the screen 104,108 is depicted. The spread gesture 410 may be initiated by a first contact 428a to the screen 104,108 by, for example, a first digit and a second contact 428b to the screen 104,108 by, for example, a second digit. The first and second contacts 428a,b may be detected by a common contact sensing portion of a common screen 104,108, by different contact sensing portions of a common screen 104,108, or by different contact sensing portions of different screens. The first contact 428a is held for a first amount of time, as represented by the border 432a, and the second contact 428b is held for a second amount of time, as represented by the border 432b. The first and second amounts of time are generally substantially the same, and the first and second contacts 428a, b generally occur substantially simultaneously. The first and second contacts 428a, b generally also include corresponding first and second contact movements 436a, b, respectively. The first and second contact movements 436*a, b* are generally in a common direction. Stated another way, the first and second contact movements 436*a, b* are away from the first and second contacts 428*a, b*. More simply stated, the spread gesture 410 may be accomplished by a user's digits touching the screen 104,108 in a spreading motion.

Figure 4G:
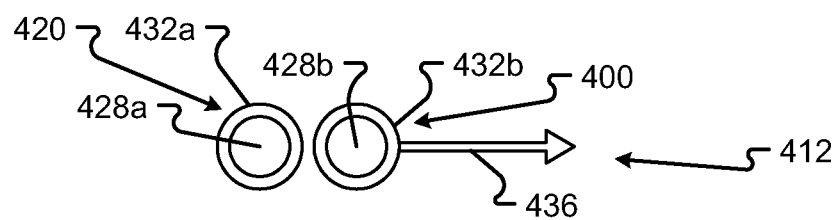
FIG. 4G is a seventh representation of an embodiment of user gesture received at a device 100.
Figure 4H:
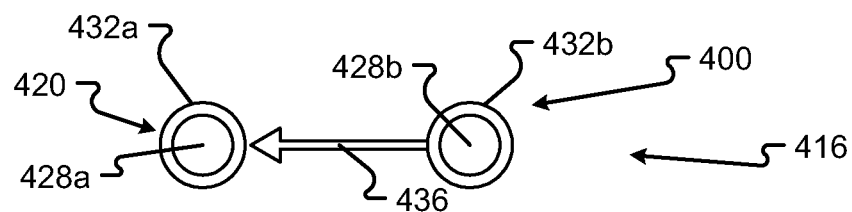
FIG. 4H is a eighth representation of an embodiment of user gesture received at a device 100.

The above gestures may be combined in any manner, such as those shown by FIGS. 4G and 4H, to produce a determined functional result. For example, in FIG. 4G a tap gesture 420 is combined with a drag or flick gesture 412 in a direction away from the tap gesture 420. In FIG. 4H, a tap gesture 420 is combined with a drag or flick gesture 412 in a direction towards the tap gesture 420.

The functional result of receiving a gesture can vary depending on a number of factors, including a state of the device 100, display 110, 114, or screen 104, 108, a context associated with the gesture, or sensed location of the gesture. The state of the device commonly refers to one or more of a configuration of the device 100, a display orientation, and user and other inputs received by the device 100. Context commonly refers to one or more of the particular application(s) selected by the gesture and the portion(s) of the application currently executing, whether the application is a single- or multi-screen application, and whether the application is a multi-screen application displaying one or more windows in one or more screens or in one or more stacks. Sensed location of the gesture commonly refers to whether the sensed set(s) of gesture location coordinates are on a touch sensitive display 110, 114 or a gesture capture region 120, 124, whether the sensed set(s) of gesture location coordinates are associated with a common or different display or screen 104,108, and/or what portion of the gesture capture region contains the sensed set(s) of gesture location coordinates.

A tap, when received by an a touch sensitive display 110, 114, can be used, for instance, to select an icon to initiate or terminate execution of a corresponding application, to maximize or minimize a window, to reorder windows in a stack, and to provide user input such as by keyboard display or other displayed image. A drag, when received by a touch sensitive display 110, 114, can be used, for instance, to relocate an icon or window to a desired location within a display, to reorder a stack on a display, or to span both displays (such that the selected window occupies a portion of each display simultaneously). A flick, when received by a touch sensitive display 110, 114 or a gesture capture region 120, 124, can be used to relocate a window from a first display to a second display or to span both displays (such that the selected window occupies a portion of each display simultaneously). Unlike the drag gesture, however, the flick gesture is generally not used to move the displayed image to a specific user-selected location but to a default location that is not configurable by the user.

The spread gesture, when received by a touch sensitive display 110, 114 or a gesture capture region 120, 124, can be used to minimize or otherwise increase the displayed area or size of a window (typically when received entirely by a common display), to switch windows displayed at the top of the stack on each display to the top of the stack of the other display (typically when received by different displays or screens), or to display an application manager (a "pop-up window" that displays the windows in the stack). The pinch gesture, when received by a touch sensitive display 110, 114 or a gesture capture region 120, 124, can be used to maximize or otherwise decrease the displayed area or size of a window, to switch windows displayed at the top of the stack on each display to the top of the stack of the other display (typically when received by different displays or screens), or to display an application manager (typically when received by an off-screen gesture capture region on the same or different screens).

The combined gestures of FIG. 4G, when received by a common display capture region in a common display or screen 104,108, can be used: (A) to hold constant a position or entry in a first window stack (a "window stack" being a first-in-last-accessible ordering or "stack" data structure of entries thereto, as one skilled in the art will understand, wherein each entry thereof provides data for displaying a corresponding application or desktop, and the ordering determines both the ordering of displaying the corresponding applications or desktops as well as their ordering for other operations such as deletion or insertion; further discussion of window stacks is provided hereinbelow; however, note that such a "window stack" may be only a logical arrangement of windows and/or desktops for one or both of the displays 110, 114) for the display 110 or 114 receiving the gesture, and (B) concurrently inserting into a second window stack, the window in the display that received the gesture. The combined gestures of FIG. 4H, when received by different display capture regions, in a common display or screen 104,108 (if such functionality is provided for a single display), or in different displays or screens, can be used to hold a first window stack location in a first window stack constant for a display receiving the tap part of the gesture while reordering a second window stack location in a second window stack to include a window in the display receiving the flick or drag gesture. Although specific gestures and gesture capture regions in the preceding examples have been associated with corresponding sets of functional results, it is to be appreciated that these associations can be redefined in any manner to produce differing associations between gestures and/or gesture capture regions and/or functional results.

Figure 5A:
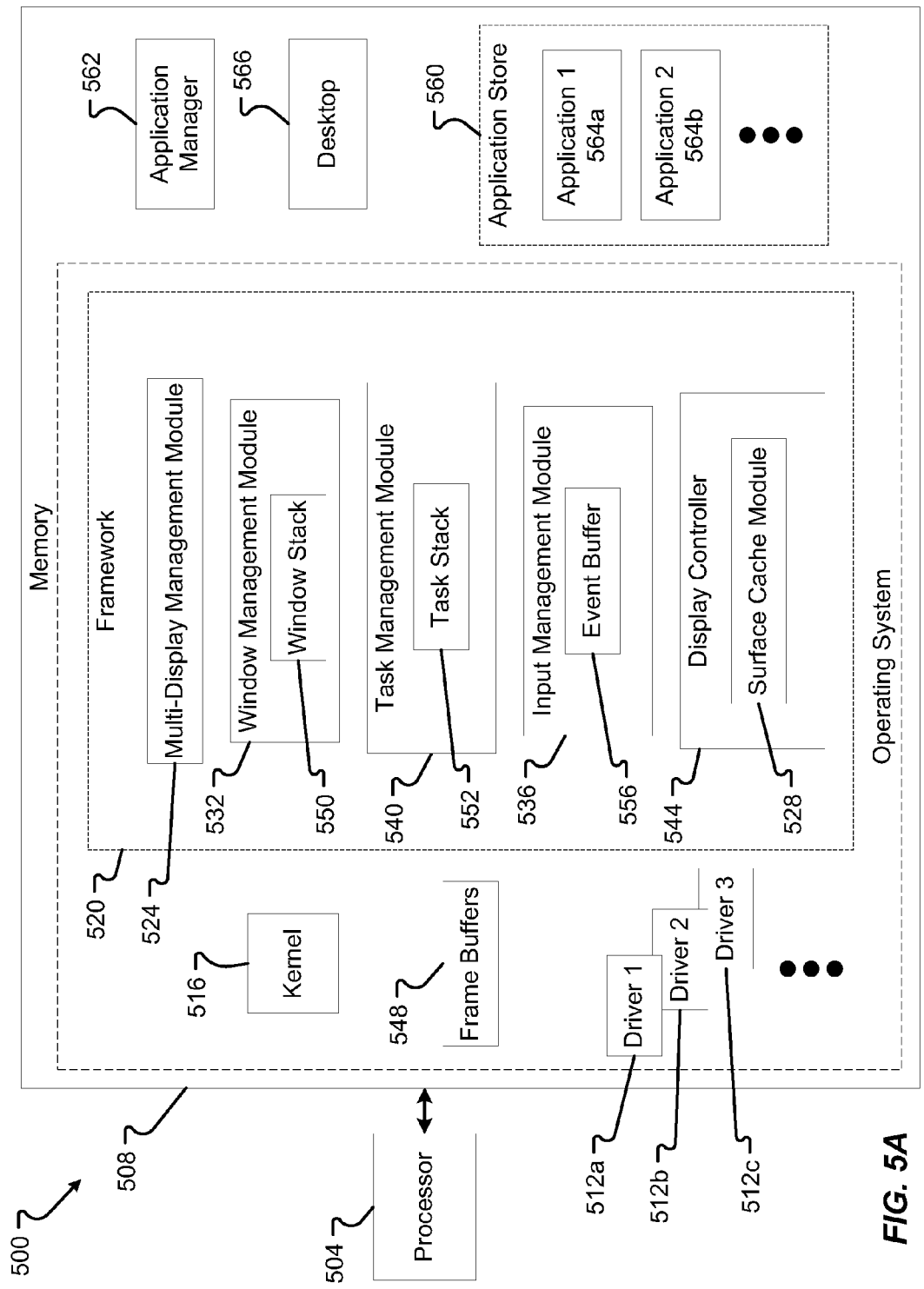
FIG. 5A is a block diagram of an embodiment of the software and/or firmware for a device 100.

Firmware and Software:

Referring to FIG. 5A, the memory 508 may store and the processor 504 may execute one or more software components. These components can include at least one operating system (OS) 516*a* and/or 516*b*, a framework 520, and/or one or more applications 564*a* and/or 564*b* from an application store 560. The processor 504 may receive inputs from drivers 512, previously described in conjunction with FIG. 2. The OS 516 can be any software, consisting of programs and data that manages computer hardware resources and provides common services for the execution of various applications 564. The OS 516 can be any operating system and, at least in some embodiments, dedicated to mobile devices, including, but not limited to, Linux, ANDROID™, iPhone OS (IOS™), WINDOWS PHONE 7™, etc. The OS 516 is operable to provide functionality to the phone by executing one or more operations, as described herein.

The applications 564 can be any higher level software that executes particular functionality for the user. Applications 564 can include programs such as email clients, web browsers, texting applications, games, media players, office suites, etc. The applications 564 can be stored in an application store 560, which may represent any memory or data storage, and the management software associated therewith, for storing the applications 564. Once executed, the applications 564 may be run in a different area of memory 508.

The framework 520 may be any software or data that allows the multiple tasks running on the device to interact. In embodiments, at least portions of the framework 520 and the discrete components described hereinafter may be considered part of the OS 516 or an application 564. However, these portions will be described as part of the framework 520, but those components are not so limited. The framework 520 can include, but is not limited to, a Multi-Display Management (MDM) module 524, a Surface Cache module 528, a Window Management module 532, an Input Management module 536, a Task Management module 540, a Display Controller, one or more frame buffers 548, a task stack 552, one or more window stacks 550 (which is a logical arrangement of windows and/or desktops in a display area), and/or an event buffer 556.

The MDM module 524 includes one or more modules that are operable to manage the display of applications or other data on the screens of the device. An embodiment of the MDM module 524 is described in conjunction with FIG. 5B. In embodiments, the MDM module 524 receives inputs from the OS 516, the drivers 512 and the applications 564. The inputs assist the MDM module 524 in determining how to configure and allocate the displays according to the application's preferences and requirements, and the user's actions. Once a determination for display configurations is determined, the MDM module 524 can bind the applications 564 to a display configuration. The configuration may then be provided to one or more other components to generate the display.

The Surface Cache module 528 includes any memory or storage and the software associated therewith to store or cache one or more images from the display screens. Each display screen may have associated with the screen a series of active and non-active windows (or other display objects (such as a desktop display)). The active window (or other display object) is currently being displayed. The non-active windows (or other display objects) were opened and/or at some time displayed but are now "behind" the active window (or other display object). To enhance the user experience, before being covered by another active window (or other display object), a "screen shot" of a last generated image of the window (or other display object) can be stored. The Surface Cache module 528 may be operable to store the last active image of a window (or other display object) not currently displayed. Thus, the Surface Cache module 528 stores the images of non-active windows (or other display objects) in a data store (not shown).

In embodiments, the Window Management module 532 is operable to manage the windows (or other display objects) that are active or not active on each of the screens. The Window Management module 532, based on information from the MDM module 524, the OS 516, or other components, determines when a window (or other display object) is active or not active. The Window Management module 532 may then put a non-visible window (or other display object) in a "not active state" and, in conjunction with the Task Management module 540 suspend the application's operation. Further, the Window Management module 532 may assign a screen identifier to the window (or other display object) or manage one or more other items of data associated with the window (or other display object). The Window Management module 532 may also provide the stored information to the application 564, the Task Management module 540, or other components interacting with or associated with the window (or other display object).

The Input Management module 536 is operable to manage events that occur with the device. An event is any input into the window environment, for example, a user interface interactions with a user. The Input Management module 536 receives the events and logically stores the events in an event buffer 556. Events can include such user interface interactions as a "down event," which occurs when a screen 104, 108 receives a touch signal from a user, a "move event," which occurs when the screen 104, 108 determines that a user's finger is moving across a screen(s), an "up event, which occurs when the screen 104, 108 determines that the user has stopped touching the screen 104, 108, etc. These events are received, stored, and forwarded to other modules by the Input Management module 536.

A task can be an application component that provides a screen with which a user can interact in order to do something, such as dial the phone, take a photo, send an email, or view a map. Each task may be given a window in which to draw a user interface. The window typically fills the display 110,114, but may be smaller than the display 110,114 and float on top of other windows. An application usually consists of multiple activities that are loosely bound to each other. Typically, one task in an application is specified as the "main" task, which is presented to the user when launching the application for the first time. Each task can then start another task to perform different actions.

The Task Management module 540 is operable to manage the operation of the one or more applications 564 that may be executed by the device. Thus, the Task Management module 540 can receive signals to execute an application stored in the application store 560. The Task Management module 540 may then instantiate one or more tasks or components of the application 564 to begin operation of the application 564. Further, the Task Management module 540 may suspend the application 564 based on user interface changes. Suspending the application 564 may maintain application data in memory but may limit or stop access to processor cycles for the application 564. Once the application becomes active again, the Task Management module 540 can again provide access to the processor.

The Display Controller 544 is operable to render and output the display(s) for the multi-screen device. In embodiments, the Display Controller 544 creates and/or manages one or more frame buffers 548. A frame buffer 548 can be a display output that drives a display from a portion of memory containing a complete frame of display data. In embodiments, the Display Controller 544 manages one or more frame buffers. One frame buffer may be a composite frame buffer that can represent the entire display space of both screens. This composite frame buffer can appear as a single frame to the OS 516. The Display Controller 544 can sub-divide this composite frame buffer as required for use by each of the displays 110, 114. Thus, by using the Display Controller 544, the device 100 can have multiple screen displays without changing the underlying software of the OS 516.

The Application Manager 562 can be a service that provides the presentation layer for the window environment. Thus, the Application Manager 562 provides the graphical model for rendering by the Window Management Module 556. Likewise, the Desktop 566 provides the presentation layer for the Application Store 560. Thus, the desktop provides a graphical model of a surface having selectable application icons for the Applications 564 in the Application Store 560 that can be provided to the Window Management Module 556 for rendering.

Figure 5B:
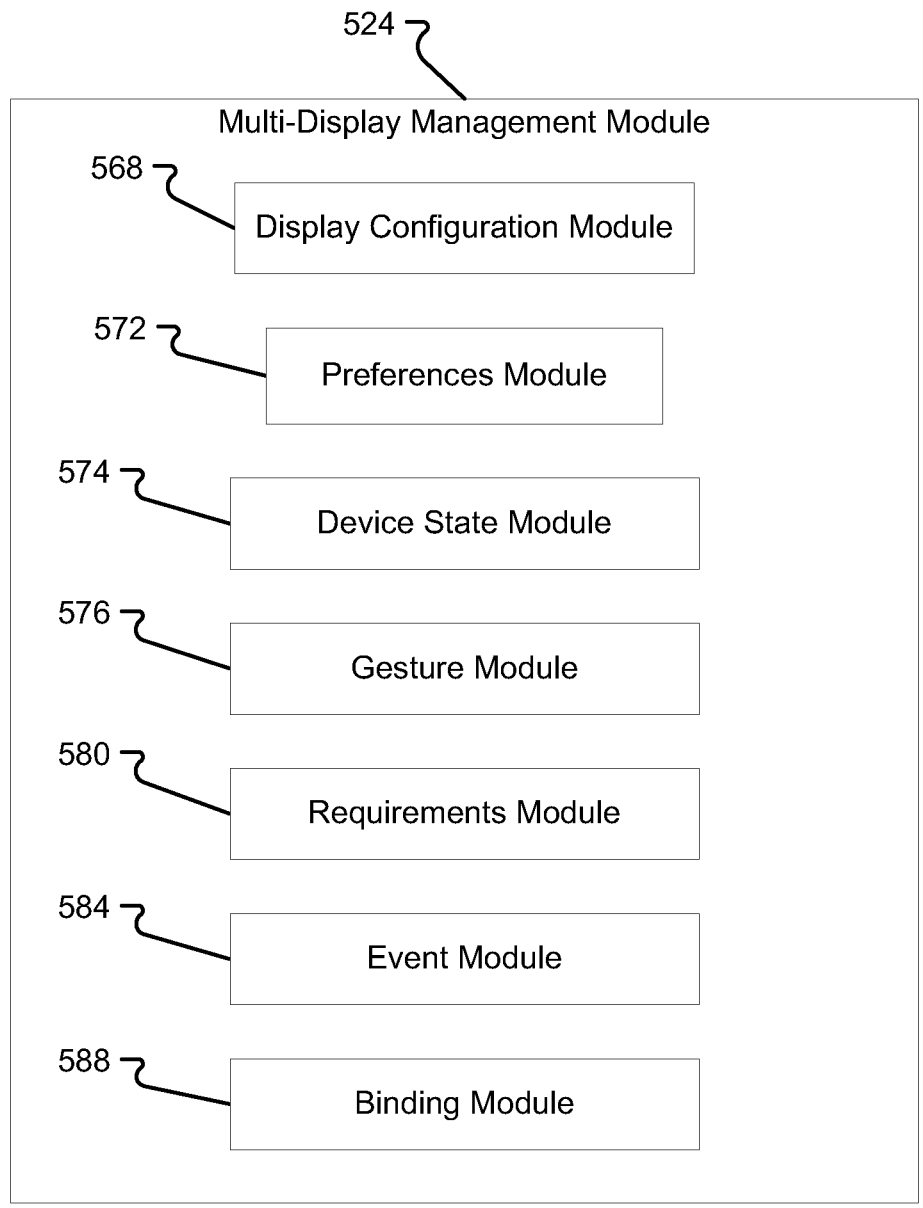
FIG. 5B is a second block diagram of an embodiment of the software and/or firmware for a device 100.

An embodiment of the MDM module 524 is shown in FIG. 5B. The MDM module 524 is operable to determine the state of the environment for the device, including, but not limited to, the orientation of the device, what applications 564 are executing, how the applications 564 are to be displayed, what actions the user is conducting, the tasks being displayed, etc. To configure the display, the MDM module 524 interprets these environmental factors and determines a display configuration, as described in conjunction with FIGS. 6A-6J. Then, the MDM module 524 can bind the applications 564 or other device components to the displays. The configuration may then be sent to the Display Controller 544 and/or the OS 516 to generate the display. The MDM module 524 can include one or more of, but is not limited to, a Display Configuration Module 568, a Preferences Module 572, a Device State Module 574, a Gesture Module 576, a Requirements Module 580, an Event Module 584, and/or a Binding Module 588.

The Display Configuration Module 568 determines the layout for the display. In embodiments, the Display Configuration Module 568 can determine the environmental factors. The environmental factors may be received from one or more other MDM module 524 modules or from other sources. The Display Configuration Module 568 can then determine from the list of factors the best configuration for the display. Some embodiments of the possible configurations and the factors associated therewith are described in conjunction with FIGS. 6A-6F.

The Preferences Module 572 is operable to determine display preferences for an application 564 or other component. For example, an application can have a preference for Single or Dual displays. The Preferences Module 572 can determine or receive the application preferences and store the preferences. As the configuration of the device changes, the preferences may be reviewed to determine if a better display configuration can be achieved for the application 564.

The Device State Module 574 is operable to determine or receive the state of the device. The state of the device can be as described in conjunction with FIGS. 3A and 3B. The state of the device can be used by the Display Configuration Module 568 to determine the configuration for the display. As such, the Device State Module 574 may receive inputs and interpret the state of the device. The state information is then provided to the Display Configuration Module 568.

The Gesture Module 576 is operable to determine if the user is conducting any actions on the user interface. Thus, the Gesture Module 576 can receive task information either from the task stack 552 or the Input Management module 536. Gestures may be as defined in accordance with FIGS. 4A through 4H. For example, moving a window causes the display to render a series of display frames that illustrate the window moving. The gesture associated with such user interface interaction can be received and interpreted by the Gesture Module 576. The information about the user gesture is then sent to the Task Management Module 540 to modify the display binding of the task.

The Requirements Module 580, similar to the Preferences Module 572, is operable to determine display requirements for an application 564 or other component. An application can have a set display requirement that must be observed. Some applications require a particular display orientation. For example, the application "Angry Birds" can only be displayed in landscape orientation. This type of display requirement can be determined or received, by the Requirements Module 580. As the orientation of the device changes, the Requirements Module 580 can reassert the display requirements for the application 564. The Display Configuration Module 568 can generate a display configuration that is in accordance with the application display requirements, as provided by the Requirements Module 580.

The Event Module 584, similar to the Gesture Module 576, is operable to determine one or more events occurring with an application or other component that can affect the user interface. Thus, the Gesture Module 576 can receive event information either from the event buffer 556 or the Task Management module 540. These events can change how the tasks are bound to the displays. For example, an email application receiving an email can cause the display to render the new message in a secondary screen. The events associated with such application execution can be received and interpreted by the Event Module 584. The information about the events then may be sent to the Display Configuration Module 568 to modify the configuration of the display.

The Binding Module 588 is operable to bind the applications 564 or the other components to the configuration determined by the Display Configuration Module 568. A binding associates, in memory, the display configuration for each application with the display and mode of the application. Thus, the Binding Module 588 can associate an application with a display configuration for the application (e.g. landscape, portrait, multi-screen, etc.). Then, the Binding Module 588 may assign a display identifier to the display. The display identifier associated the application with a particular screen of the device. This binding is then stored and provided to the Display Controller 544, the OS 516, or other components to properly render the display. The binding is dynamic and can change or be updated based on configuration changes associated with events, gestures, state changes, application preferences or requirements, etc.

User Interface Configurations:

With reference now to FIGS. 6A-J, various types of output configurations made possible by the device 100 will be described hereinafter.

Figure 6A:
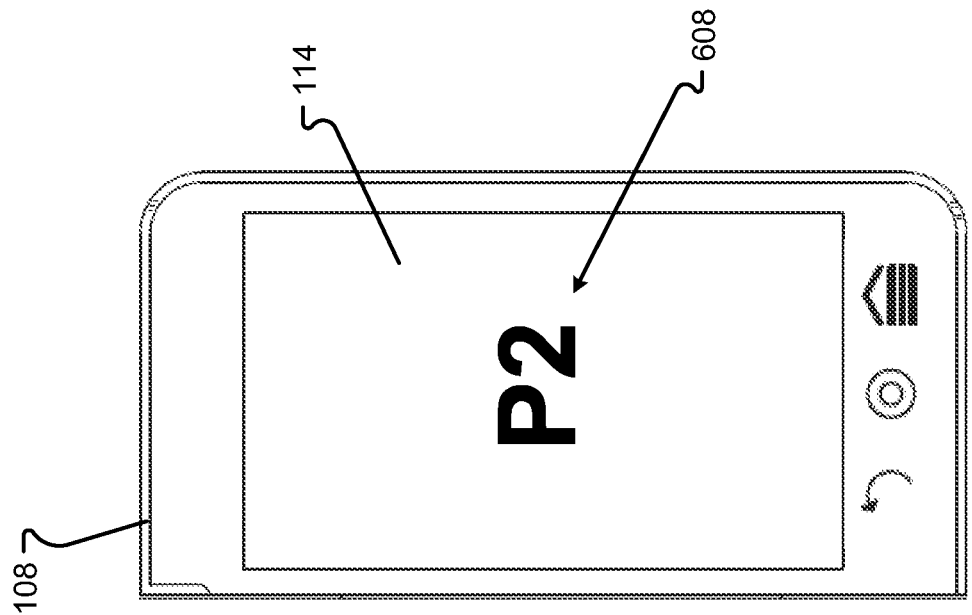
FIG. 6A is a first representation of an embodiment of a device configuration generated in response to the device state for a device 100.
Figure 6B:
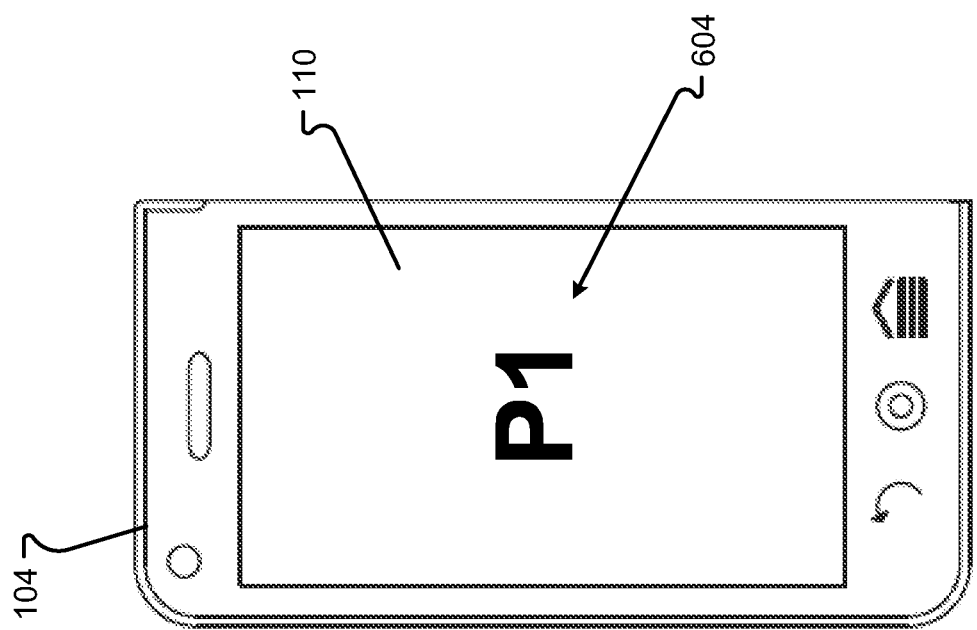
FIG. 6B is a second representation of an embodiment of a device configuration generated in response to the device state for a device 100.

FIGS. 6A and 6B depict two different output configurations of the device 100 being in a first state. Specifically, FIG. 6A depicts the device 100 being in a closed portrait state 304 where the data is displayed on the primary screen 104. In this example, the device 100 displays data via the touch sensitive display 110 in a first portrait configuration 604. As can be appreciated, the first portrait configuration 604 may only display a desktop or operating system home screen. Alternatively, one or more windows may be presented in a portrait orientation while the device 100 is displaying data in the first portrait configuration 604.

FIG. 6B depicts the device 100 still being in the closed portrait state 304, but instead data is displayed on the secondary screen 108. In this example, the device 100 displays data via the touch sensitive display 114 in a second portrait configuration 608.

It may be possible to display similar or different data in either the first or second portrait configuration 604, 608. It may also be possible to transition between the first portrait configuration 604 and second portrait configuration 608 by providing the device 100 with a user gesture (e.g., a double tap), a menu selection, or other means. Other suitable gestures may also be employed to transition between configurations. Furthermore, it may also be possible to transition the device 100 from the first or second portrait configuration 604, 608 to any other configuration described herein depending upon which state the device 100 is moved.

Figure 6C:
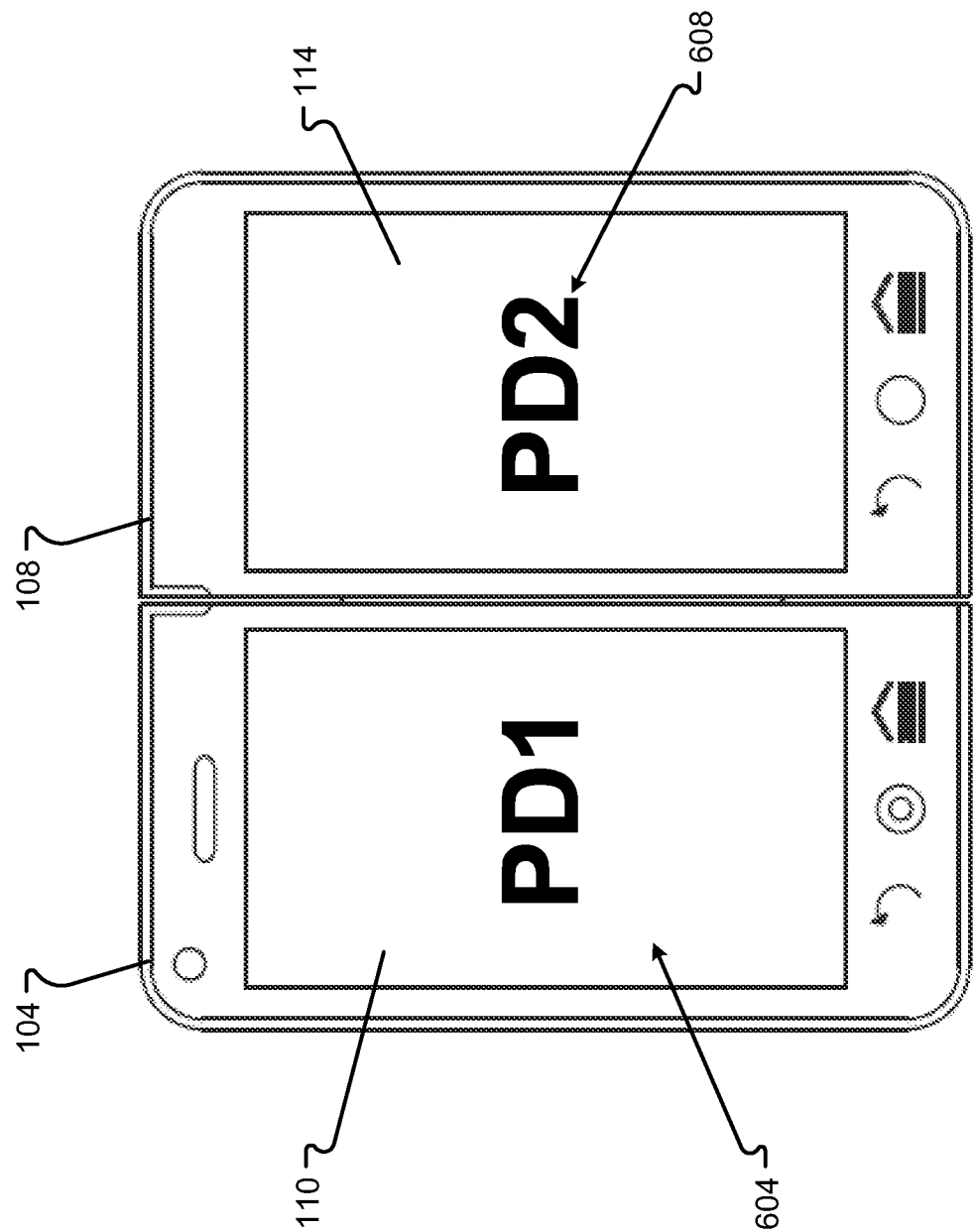
FIG. 6C is a third representation of an embodiment of a device configuration generated in response to the device state for a device 100.

An alternative output configuration may be accommodated by the device 100 being in a second state. Specifically, FIG. 6C depicts a third portrait configuration where data is displayed simultaneously on both the primary screen 104 and the secondary screen 108. The third portrait configuration may be referred to as a Dual-Portrait (DP) output configuration. In the DP output configuration, the touch sensitive display 110 of the primary screen 104 depicts data in the first portrait configuration 604 while the touch sensitive display 114 of the secondary screen 108 depicts data in the second portrait configuration 608. The simultaneous presentation of the first portrait configuration 604 and the second portrait configuration 608 may occur when the device 100 is in an open portrait state 320. In this configuration, the device 100 may display one application window in one display 110 or 114, two application windows (one in each display 110 and 114), one application window and one desktop, or one desktop. Other configurations may be possible. It should be appreciated that it may also be possible to transition the device 100 from the simultaneous display of configurations 604, 608 to any other configuration described herein depending upon which state the device 100 is moved. Furthermore, while in this state, an application's display preference may place the device into bilateral mode, in which both displays are active to display different windows in the same application. For example, a Camera application may display a viewfinder and controls on one side, while the other side displays a mirrored preview that can be seen by the photo subjects. Games involving simultaneous play by two players may also take advantage of bilateral mode.

Figure 6E:
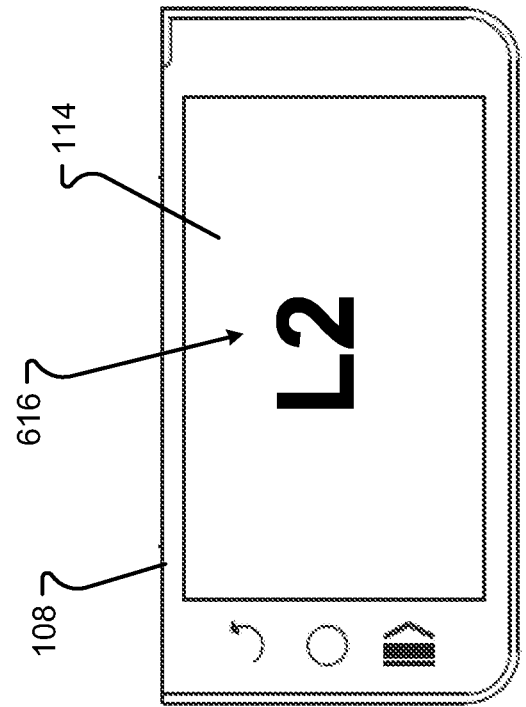
FIG. 6E is a fifth representation of an embodiment of a device configuration generated in response to the device state for a device 100.
Figure 6D:
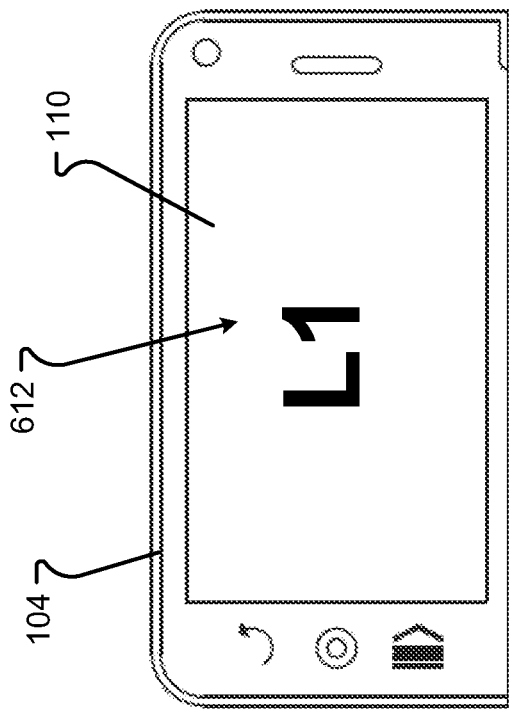
FIG. 6D is a fourth representation of an embodiment of a device configuration generated in response to the device state for a device 100.

FIGS. 6D and 6E depicts two further output configurations of the device 100 being in a third state. Specifically, FIG. 6D depicts the device 100 being in a closed landscape state 340 where the data is displayed on the primary screen 104. In this example, the device 100 displays data via the touch sensitive display 110 in a first landscape configuration 612. Much like the other configurations described herein, the first landscape configuration 612 may display a desktop, a home screen, one or more windows displaying application data, or the like.

FIG. 6E depicts the device 100 still being in the closed landscape state 340, but instead data is displayed on the secondary screen 108. In this example, the device 100 displays data via the touch sensitive display 114 in a second landscape configuration 616. It may be possible to display similar or different data in either the first or second portrait configuration 612, 616. It may also be possible to transition between the first landscape configuration 612 and second landscape configuration 616 by providing the device 100 with one or both of a twist and tap gesture or a flip and slide gesture. Other suitable gestures may also be employed to transition between configurations. Furthermore, it may also be possible to transition the device 100 from the first or second landscape configuration 612, 616 to any other configuration described herein depending upon which state the device 100 is moved.

Figure 6F:
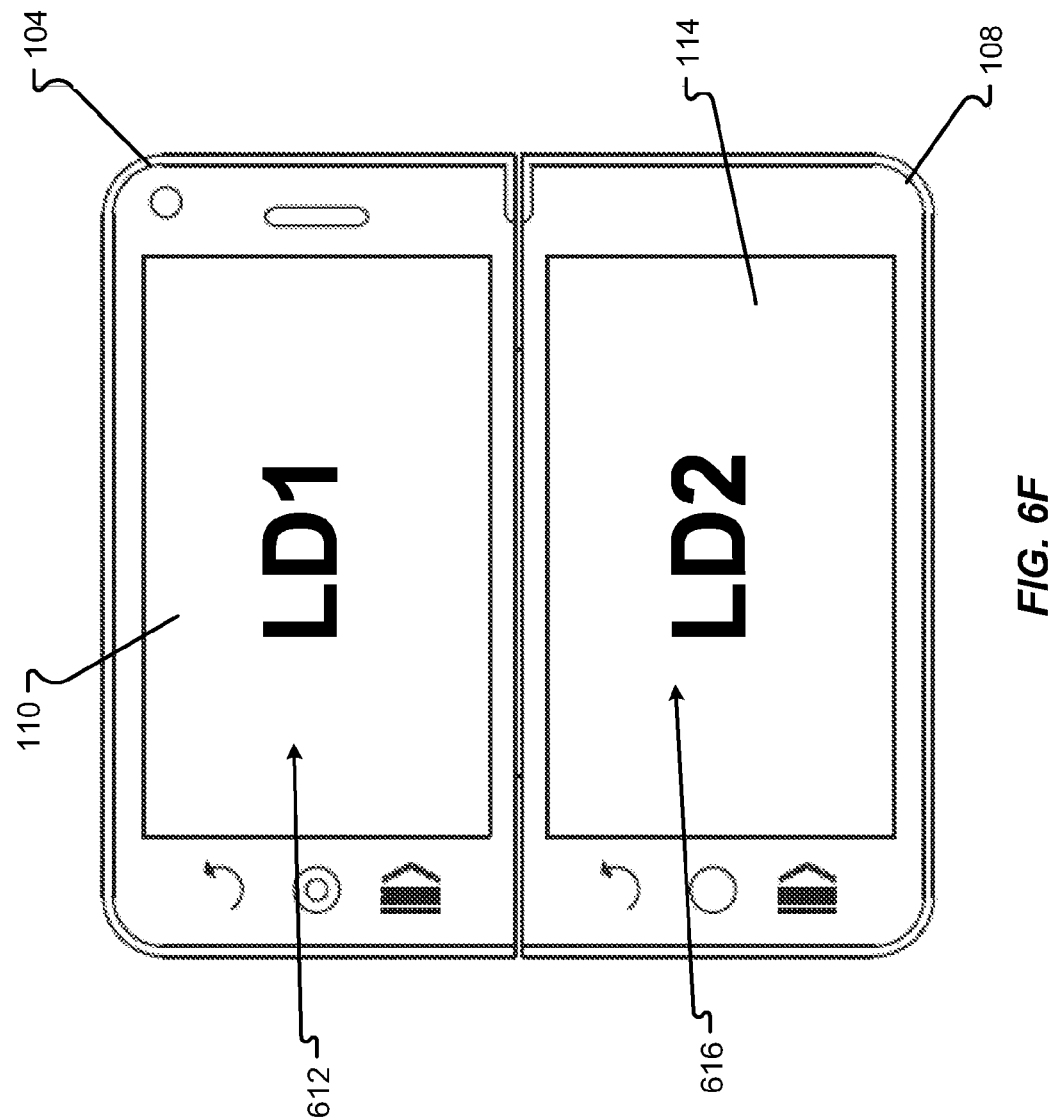
FIG. 6F is a sixth representation of an embodiment of a device configuration generated in response to the device state for a device 100.

FIG. 6F depicts a third landscape configuration where data is displayed simultaneously on both the primary screen 104 and the secondary screen 108. The third landscape configuration may be referred to as a Dual-Landscape (LD) output configuration. In the LD output configuration, the touch sensitive display 110 of the primary screen 104 depicts data in the first landscape configuration 612 while the touch sensitive display 114 of the secondary screen 108 depicts data in the second landscape configuration 616. The simultaneous presentation of the first landscape configuration 612 and the second landscape configuration 616 may occur when the device 100 is in an open landscape state 340. It should be appreciated that it may also be possible to transition the device 100 from the simultaneous display of configurations 612, 616 to any other configuration described herein depending upon which state the device 100 is moved.

FIGS. 6G and 6H depict two views of a device 100 being in yet another state. Specifically, the device 100 is depicted as being in an easel state 312. FIG. 6G shows that a first easel output configuration 618 may be displayed on the touch sensitive display 110. FIG. 6H shows that a second easel output configuration 620 may be displayed on the touch sensitive display 114. The device 100 may be configured to depict either the first easel output configuration 618 or the second easel output configuration 620 individually. Alternatively, both the easel output configurations 618, 620 may be presented simultaneously. In some embodiments, the easel output configurations 618, 620 may be similar or identical to the landscape output configurations 612, 616. The device 100 may also be configured to display one or both of the easel output configurations 618, 620 while in a modified easel state 316. It should be appreciated that simultaneous utilization of the easel output configurations 618, 620 may facilitate two-person games (e.g., Battleship®, chess, checkers, etc.), multi-user conferences where two or more users share the same device 100, and other applications. As can be appreciated, it may also be possible to transition the device 100 from the display of one or both configurations 618, 620 to any other configuration described herein depending upon which state the device 100 is moved.

Figure 6I:
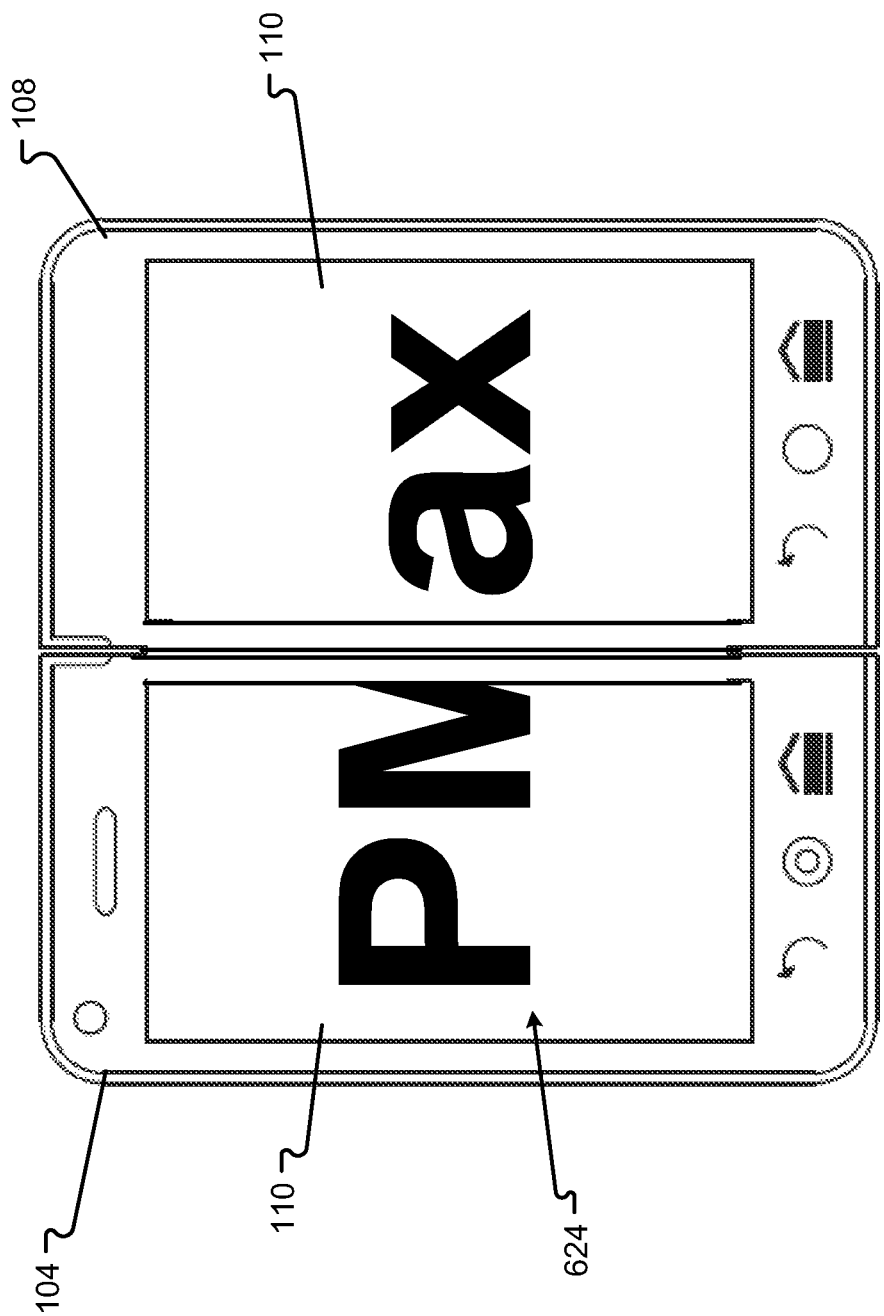
FIG. 6I is a ninth representation of an embodiment of a device configuration generated in response to the device state for a device 100.

FIG. 6I depicts yet another output configuration that may be accommodated while the device 100 is in an open portrait state 320. Specifically, the device 100 may be configured to present a single continuous image across both touch sensitive displays 110, 114 in a portrait configuration referred to herein as a Portrait-Max (PMax) configuration 624. In this configuration, data (e.g., a single image, application, window, icon, video, etc.) may be split and displayed partially on one of the touch sensitive displays while the other portion of the data is displayed on the other touch sensitive display. The Pmax configuration 624 may facilitate a larger display and/or better resolution for displaying a particular image on the device 100. Similar to other output configurations, it may be possible to transition the device 100 from the Pmax configuration 624 to any other output configuration described herein depending upon which state the device 100 is moved.

Figure 6J:
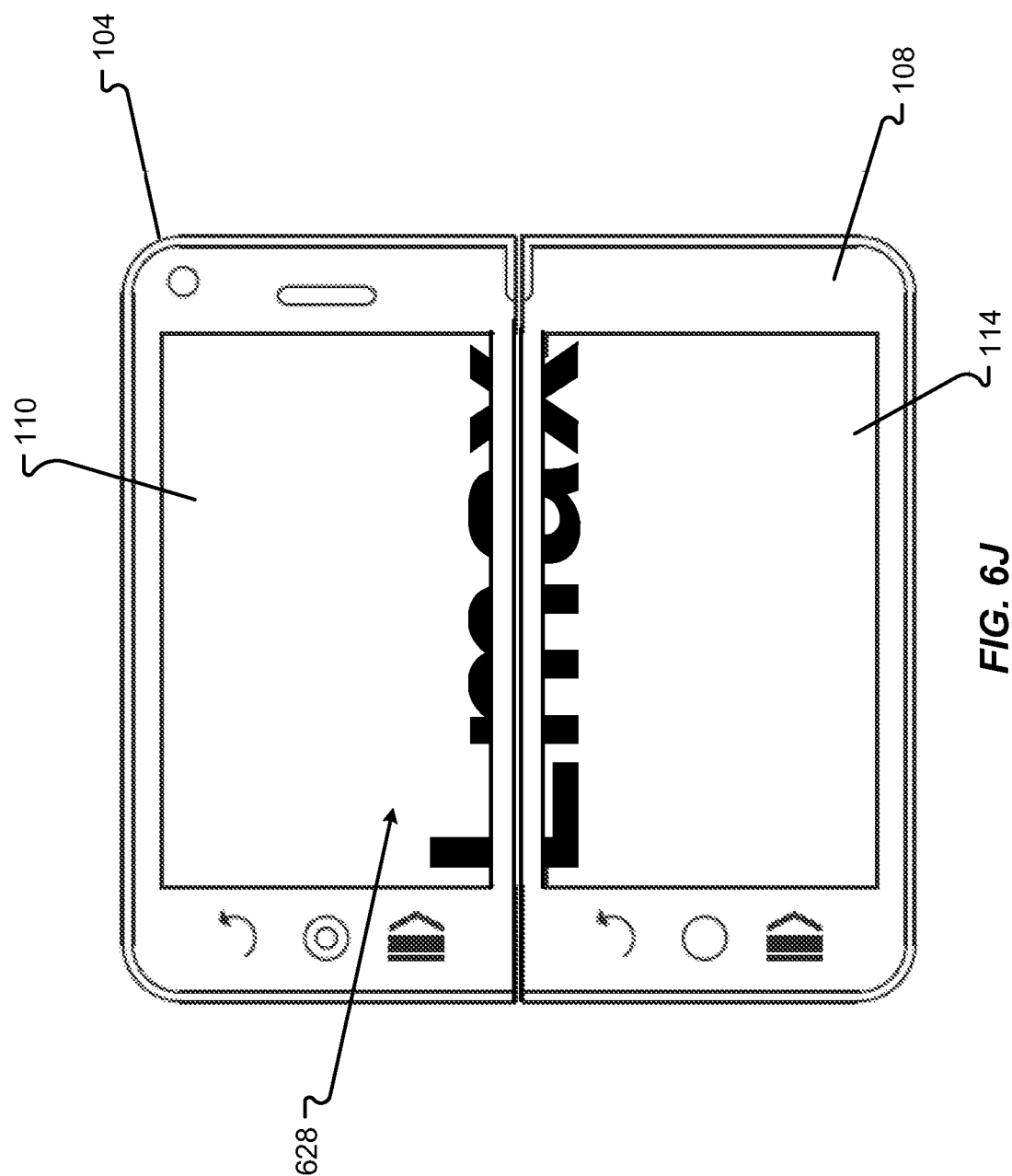
FIG. 6J is a tenth representation of an embodiment of a device configuration generated in response to the device state for a device 100.

FIG. 6J depicts still another output configuration that may be accommodated while the device 100 is in an open landscape state 348. Specifically, the device 100 may be configured to present a single continuous image across both touch sensitive displays 110, 114 in a landscape configuration referred to herein as a Landscape-Max (LMax) configuration 628. In this configuration, data (e.g., a single image, application, window, icon, video, etc.) may be split and displayed partially on one of the touch sensitive displays while the other portion of the data is displayed on the other touch sensitive display. The Lmax configuration 628 may facilitate a larger display and/or better resolution for displaying a particular image on the device 100. Similar to other output configurations, it may be possible to transition the device 100 from the Lmax configuration 628 to any other output configuration described herein depending upon which state the device 100 is moved.

Display Controls.

Figure 7A:
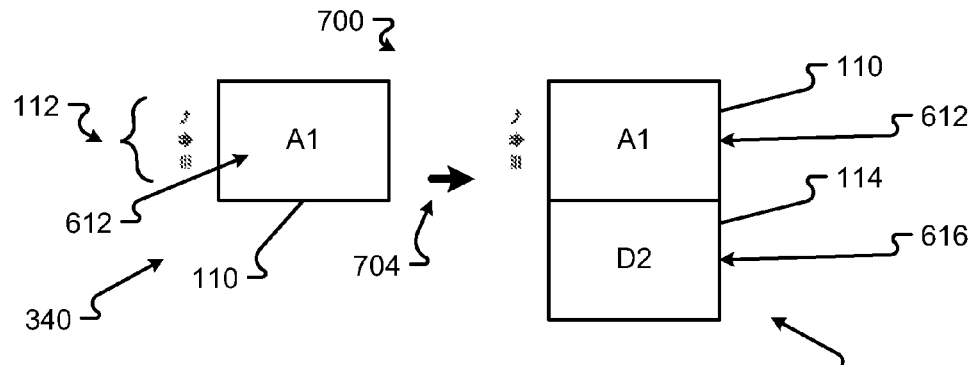
FIG. 7A depicts a first sequence of gestures to invoke a first display action in accordance with embodiments of the present disclosure.
Figure 7B:
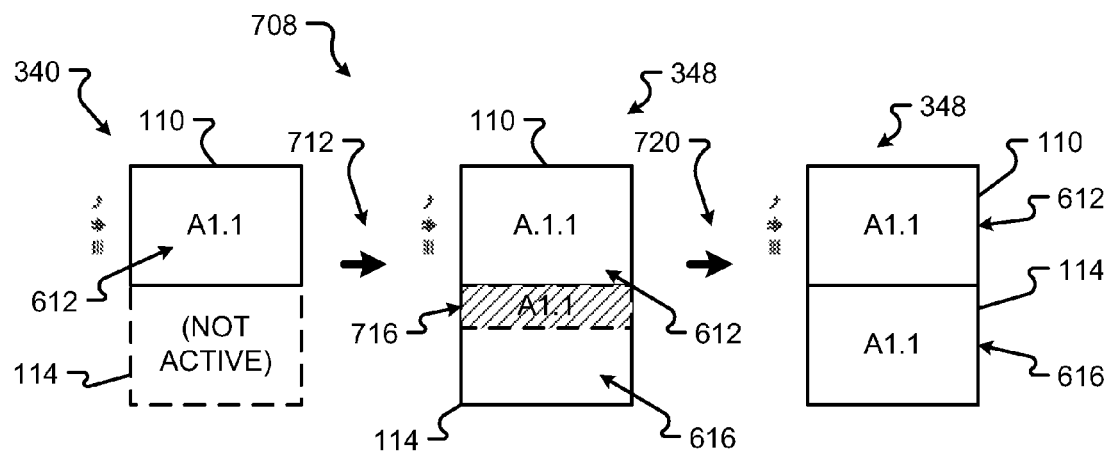
FIG. 7B depicts a second sequence of gestures to invoke a second display action in accordance with embodiments of the present disclosure.
Figure 7C:
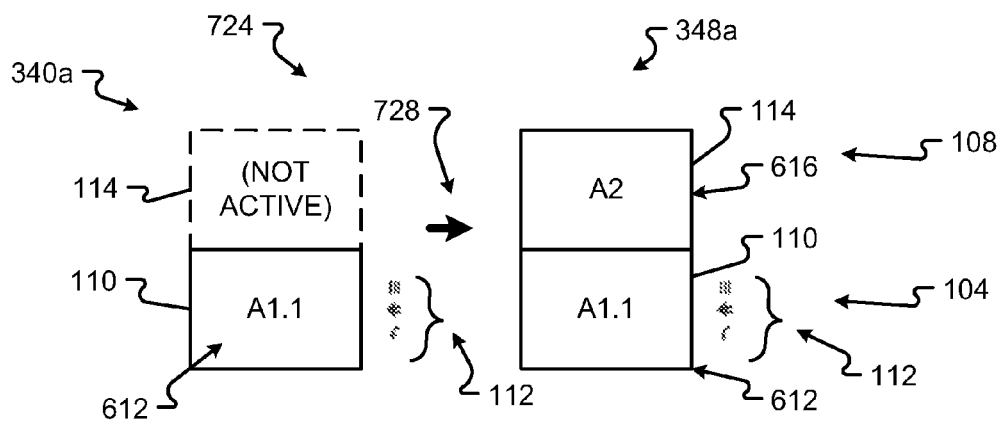
FIG. 7C depicts a third sequence of gestures to invoke a third display action in accordance with embodiments of the present disclosure.

FIGS. 7A-C depict three examples of gesture sequences that can cause the device 100 to alter the display of data thereon. Specifically, FIG. 7A depicts a first gesture sequence 700 which results in a first display action. Although the first display action is depicted as being performed on the touch sensitive displays 110, 114, it should be appreciated that the first display action can alternatively, or additionally, be performed on other parts of the primary screen 104 and/or secondary screen 108. The first gesture sequence 700 begins when the device 100 is in a closed landscape state 340. While in this state, the device 100 is displaying data in a first landscape configuration 612. The user of the device 100 then provides a first user input 704 (of the first gesture sequence 700) causing the device 100 to change from the closed landscape state 340 to an open landscape state 348. This first user input 704 may be detected by one or more of the hardware components of the device 100 as discussed herein.

In the example of FIG. 7A, the data displayed in the first landscape configuration 612 may be derived from a single-screen application, A1, which means that the application data currently being displayed on the touch sensitive display 110 is originating from the application A1 which is configured to only display data on a single screen 104 or 108. Accordingly, either before or after the MDM module 524 registers the first user input 704, the MDM module 524 determines whether the application A1 being displayed in the first landscape configuration 612 corresponds to a single-screen application. Assuming that the application A1 being displayed on the touch sensitive display 110 corresponds to a single-screen application, the MDM module 524 may be configured to select a second application or desktop D2, and cause data therefrom to be displayed in a second landscape configuration 616 of the touch sensitive display 114. Thus, in response to the first user input 704, the MDM module 524 instructs the window management module 532 to display data for the second application or desktop (D2), different from the first application (A1) being displayed on the touch sensitive display 110, on the touch sensitive display 114.

In some embodiments, the second application or desktop (D2) is selected by the window management module 532 and may correspond to a next application or desktop behind the first application in the window stack 550. More specifically, as part of selecting the second application or desktop (D2), the MDM module 524 and/or window management module 532 may reference the window stack 550 that identifies active and non-active applications or desktops, as well as display priorities for such applications or desktops, and then select the second application or desktop (D2) as the next application or desktop in the window stack 550. If no application (as opposed to desktop) is "next" behind the first application (A1), then the window management module 532 may cause either a desktop or some other default display element to be displayed on the touch sensitive display 114 as D2.

FIG. 7B depicts a second gesture sequence 708, which results in a second display action. Similar to the first display action, the second display action can be performed on any visualization or output component of the device 100. The second gesture sequence 708 begins similarly to the first gesture sequence 700 with the device 100 being in a closed landscape state 340. The difference between the two sequences, however, is that the application (A1.1) being displayed on the touch sensitive display 110 is a multi-screen application. While the device 100 is in the closed landscape state 340, first data from the application A1.1 is displayed via the touch sensitive display 110. As indicated by the dotted lines under touch sensitive display 110 and labeling, the other touch sensitive display 114 is not actively displaying any data.

The second gesture sequence 708 continues when a first user input 712 causing the device 100 to change from the closed landscape state 340 to an open landscape state 348. This first user input 712 may be similar or identical to the first user input 704.

Still referring to FIG. 7B, before or after the MDM module 524 registers the first user input 712, the MDM module 524 determines that the application being displayed in the first landscape configuration 612 corresponds to a multi-screen application. Thus, in response to the first user input 712, the MDM module 524 instructs the window management module 532 to begin dropping display data from the first application A1.1 across the touch sensitive display 114 in a transition area 716. In some embodiments, the transition area 716 moves across the touch sensitive display 114 (e.g., in a downward motion that progressively fills more and more of the touch sensitive display 114 with data from the first application A1.1). The motion of the transition area 716 may be configured to emulate a dropping of the first landscape configuration 612 across the touch sensitive display 114 under the force of gravity.

After the transition area 716 has completely moved across the touch sensitive display 114, the MDM module 524 may register a second event 720 that signifies completion of the gravity-based drop of the first application A1.1 from the touch sensitive display 110. At this point, data from the first application A1.1 may be displayed by both touch sensitive displays 110, 114 in any number of display configurations. In some embodiments, the application data from the first application A1.1 is automatically maximized. This may cause the first application A1.1 to either be simultaneously displayed on the touch sensitive screens 110, 114 in separate landscape configurations 612, 616 (e.g., an LD output configuration) or in the Lmax configuration 628. The application itself of the MDM module 524 may control the manner in which the first application A1.1 is displayed and whether the application data is displayed in an LD output configuration or an Lmax configuration 628.

In one embodiment, the type of data displayed from the first application A1.1 on the touch sensitive displays 110, 114 may vary depending upon the nature of the first application. As a non-limiting example, the type of user input available for interfacing with the first application A1.1 may change from a first type of user input (e.g., a writing-capture area, a half QWERTY keyboard) to a second type of user input (e.g., a full QWERTY keyboard or combination writing-capture area and half QWERTY keyboard) when the first application A1.1 is automatically maximized across the touch sensitive displays 110, 114 during the gravity drop. Likewise, the type of user output may vary from a first type of user output to a second type of user output when the first application A1.1 is automatically maximized across the touch sensitive displays 110, 114 during the gravity drop.

FIG. 7C depicts a third gesture sequence 724 for obtaining a resulting third display action, wherein the device 100 is in a "reverse landscape" state 340*a* where the configurable area 112 is on the opposite side (i.e., right side) of the device when the display 110 faces the user. Similar to the first and second display actions, the third display action can be performed on any visualization or output component of the device 100. The third gesture sequence 724 begins similarly to the other gesture sequences 700, 708 with the device 100 being in a closed landscape state; i.e., the reverse landscape state 340*a*. While the device 100 is in the closed reverse landscape state 340*a*, a first set of data from the first application A1.1 is displayed via the touch sensitive display 110. As indicated by the dotted lines above the touch sensitive display 110 and labeling, the other touch sensitive display 114 is not actively displaying any data.

The third gesture sequence 724 has a first user input 728 causing the device 100 to change from the closed reverse landscape state 340*a* to an open reverse landscape state 348*a*. This first user input 728 may be similar or identical to the other user inputs 704, 712, except that the secondary screen 108 is opened above the primary screen 104. Also, after the first user input 728 is received, the data from the first application A1.1 is already being displayed on the bottom touch sensitive display 110 (e.g., the display 110 which is positioned below the other touch sensitive display 114). The relative positions of the displays 110, 114 (or more specifically the screens 104, 108) may be determined from data provided by the accelerometer 176 or some other appropriate hardware component of the device 100.

In some embodiments, when the touch sensitive display 114 is opened above the active touch sensitive display 110 as in FIG. 7C, the application (A1.1) in view on the touch sensitive display 110 maintains its original display configuration. Specifically, the first application A1.1 being displayed on the touch sensitive display 110 may continue to be displayed in a first landscape configuration 612 while data from a second application A2 may be displayed in a second landscape configuration 616 via the other touch sensitive display 114 since no gravity drops occurs to pull the display of the first application A1.1 onto screen 114 which is thereabove.

The display actions performed on the touch sensitive displays 110, 114 may be controlled by the collective actions of the MDM module 524 and window management module 532 based on one or more event interrupts received from various hardware devices. Such interrupts may be registered and interpreted by the task management module 540. In selecting the data that is to be displayed via the touch sensitive display 114, the MDM module 524 and/or window management module 532 may identify the next application in a display stack as discussed above. If no application is "next" behind the first application A1.1, then the MDM module 524 and/or window management module 532 may cause either the desktop (e.g., a display rendered for the OS) or some other default display element to be displayed on the touch sensitive display 114.

Although the three examples of display actions were given in instances where an application was initially displayed on touch sensitive display 110, it should be appreciated that if the touch sensitive display 114 is initially displaying application data then the subsequent processing steps and display actions may be reversed. Specifically, if data from, e.g., the application (A1 or A1.1) is initially displayed via touch sensitive display 114 when device 100 is in a closed landscape state 340, then after the first user input 704, 712, 728 is received, the window management module 532 may manipulate the subsequent display of data on the touch sensitive display 110 depending upon the position of the touch sensitive display 110 relative to the touch sensitive display 114 and/or whether the application having data displayed is a single-screen application or a multi-screen application.

Figure 8:
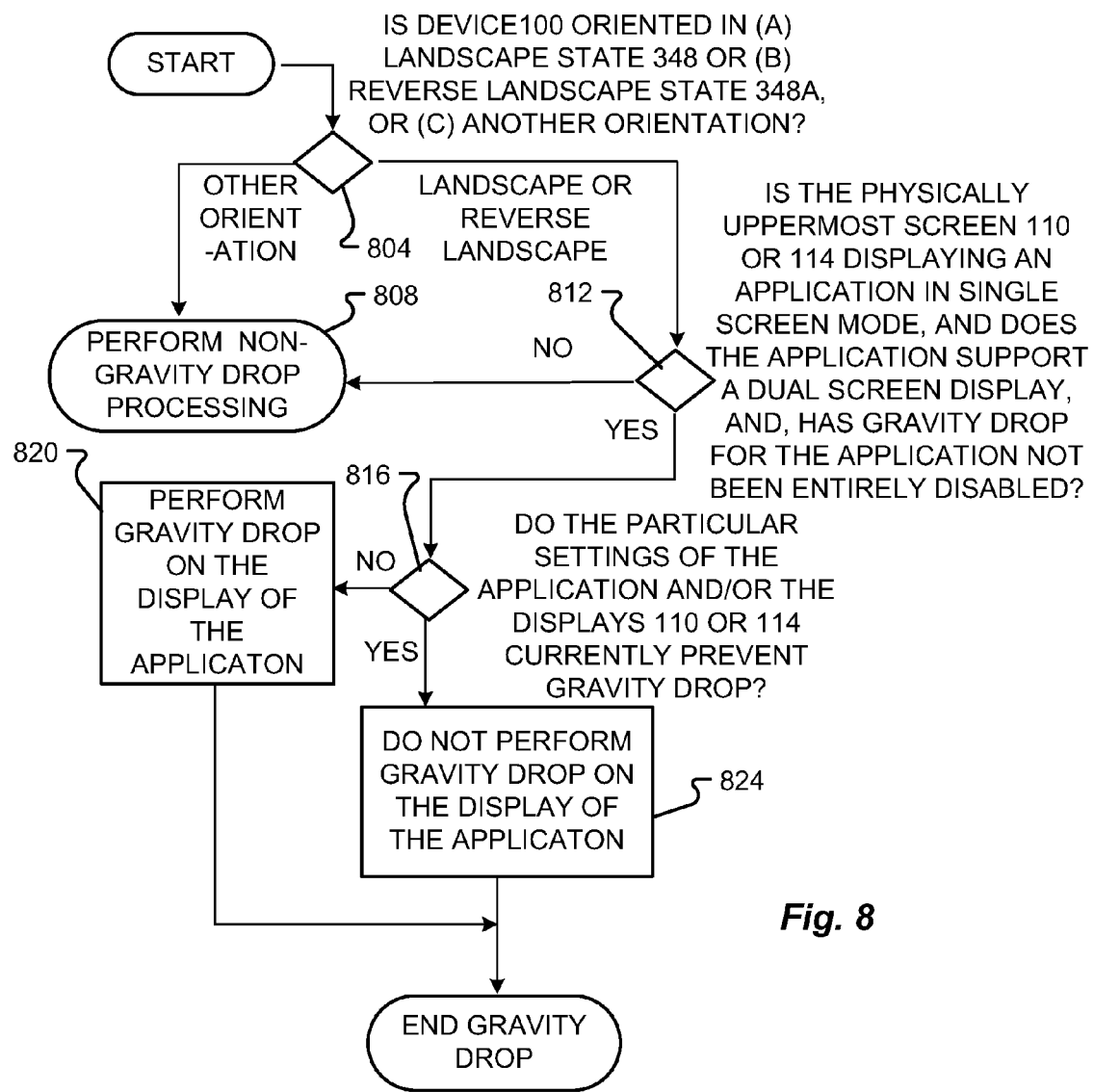
FIG. 8 is a flowchart of an embodiment of high level steps for performing gravity drop.

Referring now to FIG. 8, this figure presents a high level flowchart of the steps performed by the device 100 in determining whether a gravity drop is to be performed as described hereinabove. In particular, the steps of FIG. 8 are, in one embodiment, performed by the MDM module 524. Accordingly, in step 804, a determination is made as to whether the device 100 is oriented in (a) the open landscape state 348, or (b) the open reverse landscape state 348a, or (c) another orientation. If it is determined that the device 100 is oriented in neither the open landscape state 348 nor the open reverse landscape state 348a, then any further gravity drop processing is terminated (e.g., at least until the device 100 is reoriented, or another application is considered for gravity drop). Thus, the flowchart terminates at terminator 808 wherein the device 100 (more particularly, the MDM module 524) ceases the current gravity drop processing. If, however, it is determined in step 804 that the device 100 is in the open landscape state 348 or the open reverse landscape state 348a, then step 812 is performed, wherein further determinations are made to assure that the device 100 is properly configured for performing a gravity drop (e.g., from display 110 to display 114 as shown in FIG. 7B). In particular, step 812 determines whether the following additional three conditions are satisfied:

(a) In the current device orientation, is the display 110 or 114 that is physically uppermost (e.g., physically higher) displaying an application in a single screen mode (i.e., displaying on only one of the displays 110 or 114)?

(b) Can this application be displayed (i.e., does it support being displayed) on more than one display (e.g., both displays 110 and 114)?

(c) Has gravity drop for this application not been entirely disabled? Note that for certain applications, gravity drop should never occur. For example, in a camera or video application where the application is only operable for taking photos or videos when the device 100 is in a folded configuration, or, a game application where the game is played by two players, each viewing only one of the displays 110 or 114, and wherein the device is in the orientation as shown in, e.g., FIG. 1I.

If one or more of the conditions (a) through (c) immediately above are not satisfied, then again any further gravity drop processing is terminated (at least until the device 100 is reoriented, or another application is considered for gravity drop). Thus, the flowchart terminates at terminator 808 wherein the device 100 (more particularly, the MDM module 524) ceases the current gravity drop processing.

However, if all of the conditions (a) through (c) immediately above are satisfied, then step 816 is performed where further conditions are evaluated for determining whether gravity drop should occur. More specifically, the present step determines whether the current settings for the application would prevent a gravity drop from occurring (e.g., since such a gravity drop would not make sense to the user, or would decrease a user's experience with the device 100). For example, if the user has input a request that another application, on the lowermost one of the displays 110 or 114, remain visible on this lowermost display, then the determination in step 816 would be positive. As a further example, if at least some applications may only have gravity drop performed thereon when the lowermost display is not actively outputting new information to the user such as if a user is watching a movie or video. Accordingly, if the determination in step is positive, then in step 820, one or more gravity drop parameters may be set to indicate that no gravity drop is to be performed on the application's display as currently configured. Alternatively, if the determination in step 816 is negative, then in step 824, gravity drop is performed on the application.

Note that machine instructions corresponding to the flowchart of FIG. 8 may be performed by the device 100 when: (a) the device enters one of the open landscape configurations 348 or 348a (e.g., by the user unfolding the device, and/or rotating the device into a landscape state), or (b) a user explicitly requests the device to perform a gravity drop on a displayed application.

For an application on which a gravity drop is performed, there are of course conditions when the application's display should preferably revert back to a single screen display. In particular, such a reversion may configure the application's display to be on the same one of the displays 110 or 114 from which gravity drop occurred. The activation of a procedure to perform such a reversion is referred to herein as "reverse gravity drop". A reverse gravity drop may be performed: (a) substantially automatically, e.g., when the MDM module 524 receives appropriate input for directing the reverse gravity drop to occur, or (b) the user may explicitly request a reverse gravity drop on a displayed application upon which a gravity drop was performed.

Figure 9:
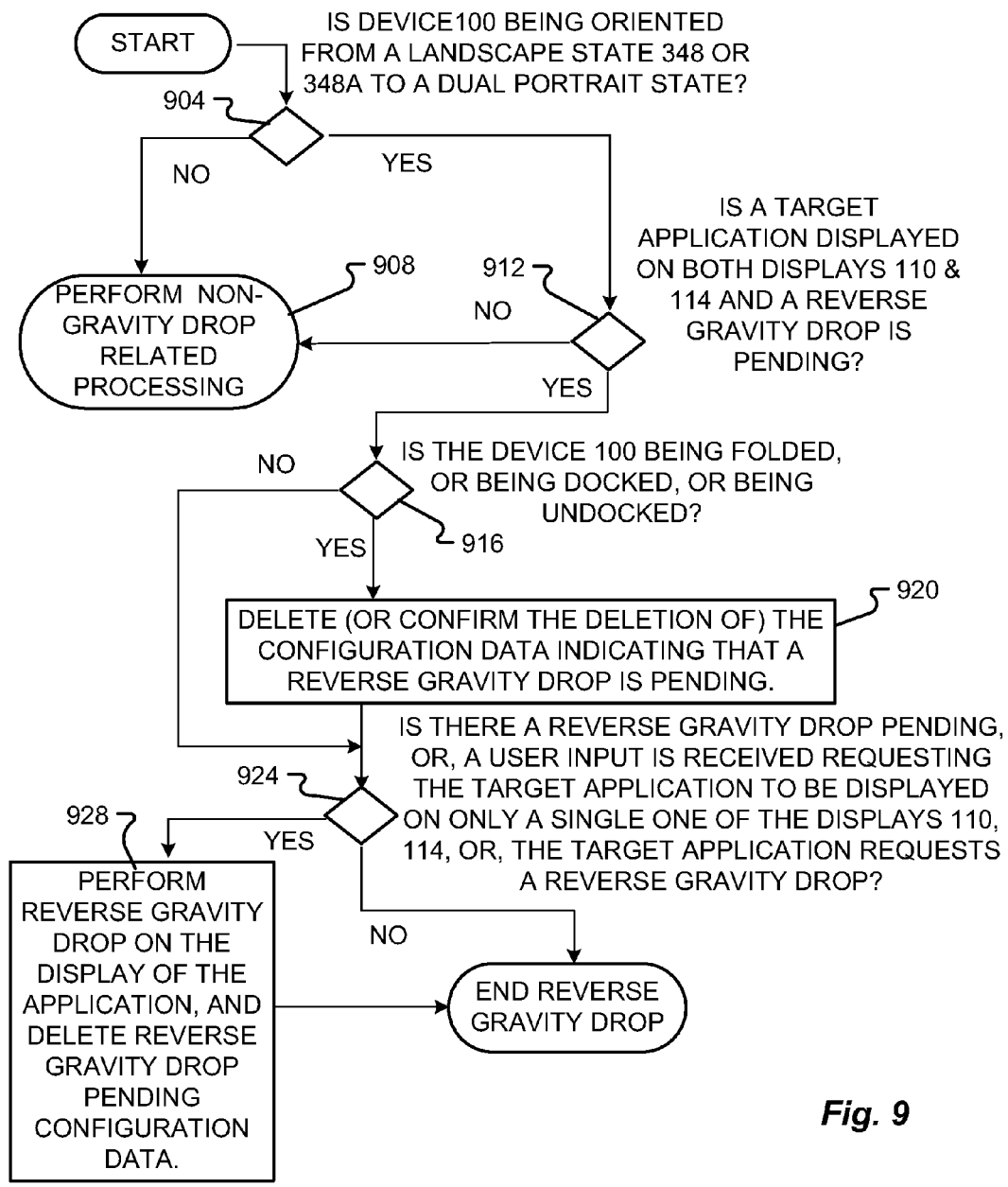
FIG. 9 is a flow chart of an embodiment of high level steps for performing reverse gravity drop.

In FIG. 9 a high level flowchart is shown providing the steps performed, e.g., by the MDM module 524 for performing a reverse gravity drop. In step 904, a determination is made as to whether the device 100 is being oriented from one of the landscape states 348 or 348a to the dual-portrait orientation. If the result of decision step 904 is negative, then any further current processing regarding performing a reverse gravity drop is terminated (e.g., at least until the device 100 is reoriented, or another application is considered for gravity drop). Thus, the flowchart terminates at terminator 908 wherein the device 100 (more particularly, the MDM module 524) ceases the current reverse gravity drop processing. If, however, there result of step 904 is positive, then step 912 is performed, wherein further determinations are made to assure that the device 100 is properly configured for performing a reverse gravity drop. In particular, step 912 determines whether: (a) the target application (for a reverse gravity drop) is indeed displayed on both displays 110 and 114, and (b) there is configuration data identifying that a reverse gravity drop is pending for being performed on the target application when specific conditions are satisfied. Note that such "reverse gravity drop pending" configuration data is created for a target application only whenever a gravity drop has previously performed on the target application, and deleted whenever a reverse gravity drop is performed on the target application. Thus, if there is "reverse gravity drop pending" configuration data for a target application, this is intended to mean that a previous gravity drop for the target application occurred, and the target application is currently displayed according to this gravity drop.

If the result to the decision step 912 is negative, then terminator 908 is encountered and processing for a reverse gravity drop ceases. However, if the result to the decision step 912 is positive, then an additional set of conditions is checked for determining if a reverse gravity drop can be performed on the display of the target application. In particular, in step 916, the following conditions (a) and (b) are evaluated by the MDM module 524:

(a) Is the device 100 being folded?
(b) Is the device 100 being docked or undocked?

That is, if the MDM module 524 receives input indicating that either of these conditions is satisfied, then in step 920, the reverse gravity pending configuration data for the target application is at least confirmed to be deleted (or at least rendered invalid). In particular, if the device 100 is being folded, then in one embodiment, any reverse gravity drop pending configuration data is automatically deleted since for various applications, a folding of the device 100 is permissible (and desirable) when the application is displayed on both the displays 110 and 114 (e.g., certain game applications). Accordingly, whether a dual screen display of an application (e.g., due to a previous gravity drop operation) should revert back to being displayed on only one of the displays 110 or 114 may be dependent on the particular application requesting or not requesting a reverse gravity drop.

Alternatively, if it is determined in step 916 that device 100 is not being folded, and not being docked, and not being undocked, then the target application remains eligible for a reverse gravity drop to be performed thereon. Accordingly, regardless of the outcome of step 916, decision step 924 is performed to evaluate whether a reverse gravity drop is actually to be performed on the display of the target application. In particular, when step 924 determines that when one or more of the following conditions (a) through (c) are satisfied, a reverse gravity drop is to be performed in step 928: (a) data for a reverse gravity drop pending is still valid, or (b) the user provides an input to explicitly request the target application to be displayed on only a single one of the displays 110 or 114, or (c) the target application requests a reverse gravity drop. Accordingly, depending on the outcome from decision step 924, reverse gravity drop is performed (in step 928), or processing for such a reverse gravity drop terminates without a reverse gravity drop being performed.

The exemplary systems and methods of this disclosure have been described in relation to processing performed for the gravity drop and reverse gravity drop. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of controlling data displayed by a multi-screen device, comprising:
   determining that the multi-screen device has moved from a first physical orientation to a different second physical orientation, wherein the multi-screen device is in a folded state in the first physical orientation, wherein in the folded state a first touchscreen and a second touchscreen of the multi-screen device are back-to-back, wherein the first touchscreen is displaying content for an application, and wherein the second physical orientation is where the first touchscreen is in a landscape state and in a same plane as the second touchscreen;
   determining a relative position of the first touchscreen to the second touchscreen in the second physical orientation, wherein the relative position includes whether the first touchscreen is above or below the second touchscreen;
   determining, when the determined relative position of the first touchscreen is above the second touchscreen, whether the application allows for a display of content to the first and second touchscreens in the second physical orientation based at least partially on a condition stored in memory;
   changing, when the determined relative position of the first touchscreen is above the second touchscreen and in response to determining the application allows for the display of content to the first and second touchscreens, a display of the application to conform to a predetermined display configuration of the application on at least one of the first and second touchscreens;
   wherein the step of changing includes a step of modifying a display of the application from being displayed on only the first touchscreen to being displayed on both the first and second touchscreens at a same time; and
   displaying, when the determined relative position of the first touchscreen is below the second touchscreen, content for a different second application to the second touchscreen while continuing to display content for the application to the first touchscreen.

2. The method of claim 1, wherein the relative position of the first touchscreen is determined to be above the second touchscreen in the second physical orientation.

3. The method of claim 2, wherein the relative position of the first touchscreen to the second touchscreen is determined, at least in part, based on data received from an accelerometer.

4. The method of claim 2, further comprising:
determining whether the application is a single-screen application or a multi-screen application; and
wherein changing the display of the application to conform to the predetermined display configuration of the application on the second touchscreen in the second physical orientation is also based on whether the application is a single-screen application or a multi-screen application.

5. The method of claim 4, wherein the application is a multi-screen application, the method further comprising:
automatically causing data from the application to be displayed on the second touchscreen in the second physical orientation.

6. The method of claim 4, wherein the application is a single-screen application and wherein data from the different second application is concurrently displayed on the second touchscreen.

7. The method of claim 2, wherein the application is determined to prevent the display of content to the first and second touchscreens in the second physical orientation.

8. The method of claim 7, wherein in response to determining that the application prevents the display of content to the first and second touchscreens the method further comprises:
displaying content for the different second application to the second touchscreen simultaneously with data from the application being displayed on the first touchscreen.

9. The method of claim 1, wherein determining that the multi-screen device has moved from a first physical orientation to a different second physical orientation is based on data received from a hall effect sensor and a timer.

10. A non-transitory computer-readable medium having machine instructions stored thereon, the instructions comprising:
a first set of the instructions configured to determine that a multi-screen device has moved from a first physical orientation to a different second physical orientation, wherein the multi-screen device is in a folded state in the first physical orientation, wherein in the folded state a first touchscreen and a second touchscreen of the multi-screen device are back-to-back, wherein the first touchscreen is displaying content for an application, and wherein the second physical orientation is where the first touchscreen is in a landscape state and in a same plane as the second touchscreen;
a second set of the instructions configured to determine a relative position of the first touchscreen to the second touchscreen in the second physical orientation, wherein the relative position includes whether the first touchscreen is above or below the second touchscreen;
a third set of the instructions configured to determine, when the determined relative position of the first touchscreen is above the second touchscreen, whether the application allows for a display of content to the first and second touchscreens in the second physical orientation based at least partially on a condition stored in memory;
a fourth set of the instructions configured to change, when the determined relative position of the first touchscreen is above the second touchscreen and in response to determining the application allows for the display of content to the first and second touchscreens, a display of the application to conform to a predetermined display configuration of the application on at least one of the first and second touchscreens;
wherein the fourth set of the instructions are configured to modify a display of the application from being displayed on only the first touchscreen to being displayed on both the first and second touchscreens at a same time; and
a fifth set of the instructions configured to display, when the determined relative position of the first touchscreen is below the second touchscreen, content for a different second application to the second touchscreen while continuing to display content for the application to the first touchscreen.

11. The computer-readable medium of claim 10, wherein the first touchscreen corresponds to a primary screen and wherein the second touchscreen corresponds to a secondary screen.

12. The computer-readable medium of claim 10, wherein the relative position of the first touchscreen is determined to be above the second touchscreen in the second physical orientation, and wherein data displayed on the second touchscreen in the second physical orientation is also based on whether the application is a single-screen application or a multi-screen application.

13. The computer-readable medium of claim 12, wherein the application is a multi-screen application and wherein the instructions configured to change the display of the application to conform to a predetermined display configuration of the application on the first and second touchscreens also generates a transition area on the second touchscreen that moves across and progressively fills the second touchscreen with data from the first application.

14. The computer-readable medium of claim 13, wherein the data from the application is automatically displayed on both the first and second touchscreens after the execution of the instruction for modifying, concurrently displaying at least a portion of the content on each the first and second touchscreens.

15. The computer-readable medium of claim 12, wherein the application is a single-screen application and wherein data from the different second application is automatically displayed on the second touchscreen immediately after the multi-screen device transitions to the second physical orientation.

16. A multi-screen user device, comprising:
a first touchscreen including a first display area;
a second touchscreen including a second display area;
an attachment configured to foldably connect the first touchscreen with the second touchscreen;
a first sensor configured to produce a first signal indicative of a position of the attachment;
a second sensor configured to produce a second signal indicative of relative positions of the first touchscreen to the second touchscreen; and
a non-transitory computer-readable medium having instructions stored thereon that include:
a first set of the instructions configured to determine that the multi-screen device has moved from a first physical orientation to a different second physical orientation, wherein the multi-screen device is in a folded state in the first physical orientation, wherein in the folded state the first touchscreen and the second touchscreen of the multi-screen device are back-to-back, wherein the first touchscreen is displaying content for an application, and wherein the second physical orientation is where the first touchscreen is in a landscape state and in a same plane as the second touchscreen;

a second set of the instructions configured to determine a relative position of the first touchscreen to the second touchscreen in the second physical orientation, wherein the relative position includes whether the first touchscreen is above or below the second touchscreen;

a third set of the instructions configured to determine, when the determined relative position of the first touchscreen is above the second touchscreen, whether the application allows for a display of content to the first and second touchscreens in the second physical orientation based at least partially on a condition stored in memory;

a fourth set of the instructions configured to change, when the determined relative position of the first touchscreen is above the second touchscreen and in response to determining the application allows for the display of content to the first and second touchscreens, a display of the application to conform to a predetermined display configuration of the application on at least one of the first and second touchscreens;

wherein the fourth set of the instructions are configured to modify a display of the application from being displayed on only the first touchscreen to being displayed on both the first and second touchscreens at a same time; and a fifth set of the instructions configured to display, when the determined relative position of the first touchscreen is below the second touchscreen, content for a different second application to the second touchscreen while continuing to display content for the application to the first touchscreen.

17. The device of claim 16, wherein the application is a multi-screen application and wherein the fourth set of instructions is further configured to generate a transition area on the second display area that moves across and progressively fills the second display area with data from the application.

18. The device of claim 17, wherein the data from the application is automatically displayed on both the first and second touchscreens after the execution of the instruction for modifying, concurrently displaying at least a portion of the content on each the first and second touchscreens.

19. The device of claim 16, wherein the relative position of the first touchscreen is determined to be above the second touchscreen in the second physical orientation, and wherein the application is determined to prevent the display of content to the first and second touchscreens in the second physical orientation and displaying the application on only the first touchscreen.

20. The device of claim 16, wherein the relative position of the first touchscreen is determined to be above the second touchscreen, based at least partially on the second signal.

* * * * *